(12) United States Patent
Koeske et al.

(10) Patent No.: US 9,707,815 B2
(45) Date of Patent: Jul. 18, 2017

(54) FLEXIBLE SLEEVE, GAS SPRING ASSEMBLY AND METHOD

(71) Applicant: Firestone Industrial Products Company, LLC, Indianapolis, IN (US)

(72) Inventors: Paul P. Koeske, Fishers, IN (US); Stephen C. Street, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/557,084

(22) Filed: Dec. 1, 2014

(65) Prior Publication Data

US 2015/0084248 A1 Mar. 26, 2015

Related U.S. Application Data

(63) Continuation of application No. 13/424,029, filed on Mar. 19, 2012, now Pat. No. 8,899,561, which is a continuation of application No. PCT/US2010/048932, filed on Sep. 15, 2010, said application No. 13/424,029 is a continuation-in-part
(Continued)

(51) Int. Cl.
| | |
|---|---|
| *F16F 5/00* | (2006.01) |
| *B60G 11/27* | (2006.01) |
| *B60G 11/28* | (2006.01) |
| *F16F 9/04* | (2006.01) |
| *F16F 9/05* | (2006.01) |

(52) U.S. Cl.
CPC ............. *B60G 11/27* (2013.01); *B60G 11/28* (2013.01); *F16F 9/0454* (2013.01); *F16F 9/05* (2013.01); *B60G 2202/152* (2013.01); *Y10T 29/49611* (2015.01); *Y10T 428/13* (2015.01)

(58) Field of Classification Search
CPC ........... F16F 9/0454; F16F 9/05; B60G 11/27; B60G 11/28; B60G 2202/152; Y10T 29/49611; Y10T 428/13
USPC ..... 267/122, 35, 64.19, 64.21, 64.23, 64.24, 267/64.27; 280/124.157, 124.158
See application file for complete search history.

(56) References Cited

U.S. PATENT DOCUMENTS

| | | |
|---|---|---|
| 5,382,006 A | 1/1995 | Arnold |
| 5,671,907 A | 9/1997 | Arnold |
| (Continued) | | |

FOREIGN PATENT DOCUMENTS

| | | |
|---|---|---|
| DE | 4115028 | 5/1991 |
| EP | 0080561 | 6/1983 |
| (Continued) | | |

OTHER PUBLICATIONS

International Search Report for corresponding patent application No. PCT/US2010/048932 dated May 25, 2011.
(Continued)

*Primary Examiner* — Pamela Rodriguez
(74) *Attorney, Agent, or Firm* — Thomas R. Kingsbury; Fay Sharpe LLP

(57) ABSTRACT

A flexible sleeve dimensioned for securement to an associated end member for an associated gas spring assembly includes a flexible wall. An annular reinforcement member is embedded within the flexible wall. A retainment element that includes an element surface is disposed along the flexible wall such that at least the element surface is outwardly exposed. At least one gas spring piston, at least one gas spring assembly and at least one method are also included.

16 Claims, 33 Drawing Sheets

Related U.S. Application Data of application No. PCT/US2010/048942, filed on Sep. 15, 2010, said application No. 13/424,029 is a continuation-in-part of application No. PCT/US2010/048948, filed on Sep. 15, 2010, said application No. 13/424,029 is a continuation-in-part of application No. PCT/US2010/048965, filed on Sep. 15, 2010.

(60) Provisional application No. 61/243,326, filed on Sep. 17, 2009, provisional application No. 61/243,334, filed on Sep. 17, 2009, provisional application No. 61/243,341, filed on Sep. 17, 2009, provisional application No. 61/243,345, filed on Sep. 17, 2009.

(56) References Cited

U.S. PATENT DOCUMENTS

| | | | |
|---|---|---|---|
| 6,386,524 | B1 | 5/2002 | Levy |
| 6,439,550 | B1 | 8/2002 | Koch |
| 6,637,733 | B1 | 10/2003 | Weitzenhof |
| 2009/0057967 | A1 | 3/2009 | Koeske |

FOREIGN PATENT DOCUMENTS

| | | |
|---|---|---|
| EP | 0306732 | 3/1989 |
| EP | 0969224 | 1/2000 |
| JP | 03-000336 | 1/1991 |
| WO | WO-7900411 | 7/1979 |
| WO | WO-94-25737 | 11/1994 |

OTHER PUBLICATIONS

Written Opinion for corresponding patent application No. PCT/US2010/048932 dated May 25, 2011.
International Search Report for corresponding patent application No. PCT/US2010/048942 dated Mar. 24, 2011.
Written Opinion for corresponding patent application No. PCT/US2010/048942 dated Mar. 24, 2011.
International Search Report for corresponding patent application No. PCT/US2010/048948 dated Mar. 25, 2011.
Written Opinion for corresponding patent application No. PCT/US2010/048948 dated Mar. 25, 2011.
International Search Report for corresponding patent application No. PCT/US2010/048965 dated May 24, 2011.
Written Opinion for corresponding patent application No. PCT/US2010/048965 dated May 24, 2011.

FLEXIBLE SLEEVE, GAS SPRING ASSEMBLY AND METHOD

This application is a continuation of U.S. patent application Ser. No. 13/424,029 filed on Mar. 19, 2012, now U.S. Pat. No. 8,899,561, which is a continuation of PCT Patent Application No. PCT/US2010/048932 filed on 15 Sep. 2010, which claims priority from U.S. Provisional Patent Application Nos. 61/243,326 filed on 17 Sep. 2009; 61/243,334 filed on 17 Sep. 2009; 61/243,341 filed on 17 Sep. 2009 and 61/243,345 filed on 17 Sep. 2009; a continuation-in-part of PCT Patent Application No. PCT/US2010/048942 filed on 15 Sep. 2010, which claims priority from U.S. Provisional Patent Application Nos. 61/243,326 filed on 17 Sep. 2009; 61/243,334 filed on 17 Sep. 2009; 61/243,341 filed on 17 Sep. 2009 and 61/243,345 filed on 17 Sep. 2009; a continuation-in-part of PCT Patent Application No. PCT/US2010/048948 filed on 15 Sep. 2010, which claims priority from U.S. Provisional Patent Application Nos. 61/243,326 filed on 17 Sep. 2009; 61/243,334 filed on 17 Sep. 2009; 61/243,341 filed on 17 Sep. 2009 and 61/243,345 filed on 17 Sep. 2009; and a continuation-in-part of PCT Patent Application No. PCT/US2010/048965 filed on 15 Sep. 2010, which claims priority from U.S. Provisional Patent Application Nos. 61/243,326 filed on 17 Sep. 2009; 61/243,334 filed on 17 Sep. 2009; 61/243,341 filed on 17 Sep. 2009 and 61/243,345 filed on 17 Sep. 2009; all of which are hereby incorporated herein by reference in their entirety.

BACKGROUND

The subject matter of the present disclosure broadly relates to the art of spring devices and, more particularly, to a flexible sleeve that has an inside surface and includes a retainment element disposed along the inside surface of the flexible sleeve for abuttingly engaging an associated end member. The subject matter of the present disclosure also relates to a gas spring assembly and a method of assembling a gas spring that includes such a flexible sleeve.

The subject matter of the present disclosure may find particular application and use in conjunction with suspension systems of wheeled vehicles, and may be described herein with reference thereto. However, it is to be appreciated that the subject matter of the present disclosure is also amenable to other applications and environments, and that the specific uses shown and described herein are merely exemplary. For example, the subject matter of the present disclosure could be used in support structures, height adjusting systems and actuators associated with industrial machinery, components thereof and/or other such equipment.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In many applications and uses associated with wheeled motor vehicles, the suspension system of the vehicle is adapted and arranged such that there are substantially no operating conditions, during normal usage, under which the plurality of spring devices would be tensioned or otherwise undergo a tension load. That is, the configuration and/or use of conventional suspension systems is such that the spring devices are not tensioned under during rebound motion and are generally used in compression under normal operating conditions. In such operating environments, it is possible to utilize a gas spring assembly that has a simplified construction and minimal retention of the flexible wall on the piston of the gas spring assembly in the direction opposite that associated with normal use.

As a more-specific example, a construction can be used in which an open end of the flexible wall thereof is "snapped-on" or otherwise press-fit onto the piston of the gas spring assembly. It will be appreciated that such "snap-on" constructions can result in lower cost gas spring assemblies, at least in part, because a reduced number of components can be used and also because simplified assembly and other manufacturing techniques can be employed.

This "snap-on" interengagement between the open end of the flexible wall and a portion of the piston normally provides sufficient retention for handling and installation purposes. It will be recognized, however, that such constructions are often deemed to be poorly suited for applications in which the gas spring assembly could be stretched or otherwise placed in tension, as this could generate an undesirable separation between the flexible wall and the piston of the gas spring assembly.

It is believed desirable to develop a gas spring piston, as well as a gas spring assembly and method of assembly including the same, that are capable of providing improved retention of the flexible wall on the gas spring piston during use of the gas spring assembly under tension conditions and/or overcoming other disadvantages of known constructions while maintaining a relatively low cost of manufacture and ease of assembly.

BRIEF DESCRIPTION

One example of a gas spring sleeve in accordance with the subject matter of the present disclosure that is dimensioned for securement between associated first and second end members of an associated gas spring assembly can include a flexible wall having a longitudinal axis. The flexible wall can extend circumferentially about the axis and can extend longitudinally between opposing first and second open ends. The flexible wall can include an inside surface, an outside surface and a first end surface that extends between and connects the inside and outside surfaces along the first open end. An annular reinforcement member can be substantially fully embedded within the flexible wall adjacent the first open end such that the reinforcement member is disposed within the flexible wall in spaced relation to the inside surface, the outside surface and the first end surface. A retainment element having an element surface can be disposed along the flexible wall adjacent the first open end such that the element surface is exposed along one of the inside surface, the outside surface and the first end surface of the flexible wall.

Another example of a flexible sleeve in accordance with the subject matter of the present disclosure that is dimensioned for securement to an associated end member for an associated gas spring assembly can include a flexible wall having a longitudinal axis and extending circumferentially about the axis. The flexible wall can include an inside surface that is adapted to at least partially define a spring chamber, an outside surface opposite the inside surface, and an end surface disposed adjacent an open end of the flexible wall. An annular reinforcement member can be substantially fully embedded within the flexible wall adjacent the open end. At least one retainment element can be included and can include an element surface. The at least one retainment element can be disposed along at least one of the inside surface, the outside surface and the end surface of the flexible wall such that the element surface is at least partially exposed along the flexible wall.

One example of a gas spring assembly in accordance with the subject matter of the present disclosure can include a first end member. A second end member can be spaced from the first end member and can have a longitudinal axis. The second end member can extend longitudinally between opposing first and second ends. The second end member can include a first side wall extending circumferentially about the axis and generally longitudinally between the first and second ends. A first end wall can be disposed along the first end and can extend circumferentially about the axis in generally transverse relation to the first side wall. A second side wall can extend circumferentially about the axis and can extend from the first end wall in a direction generally opposite the second end of the second end member. The second side wall can include a radially outwardly-extending retainment ridge that at least partially defines a shoulder surface disposed in facing relation to the first end wall. A flexible sleeve can extend between longitudinally-spaced first and second open ends. The first open end of the flexible sleeve can be secured to the first end member and the second open end of the flexible sleeve can be secured to the second end member such that a spring chamber is at least partially defined therebetween. The flexible sleeve can include a flexible wall extending circumferentially about the axis and extending longitudinally between the first and second open ends. The flexible wall can include an inside surface, an outside surface and a first end surface extending between and connecting the inside and outside surfaces along the second open end. An annular reinforcement member can be substantially fully embedded within the flexible wall adjacent the second open end such that the reinforcement member is disposed within the flexible wall in spaced relation to the inside surface, the outside surface and the first end surface thereof. A retainment element having an element surface can be disposed along the flexible wall adjacent the second open end such that the element surface is exposed along at least one of the inside surface, the outside surface and the first end surface of the flexible wall. The second open end of the flexible wall and the retainment element can be received on the second end member such that the first end surface of the flexible wall is in abutting engagement with the second side wall of the second end member and such that the outside surface of the flexible wall is disposed toward the first end wall of the second end member with the inside surface of the flexible wall and the exposed element surface being disposed toward the shoulder surface of the retainment ridge.

One example of a method of assembling a gas spring in accordance with the subject matter of the present disclosure can include providing a flexible sleeve having a longitudinal axis and extending between longitudinally-spaced first and second open ends. The flexible sleeve can include a flexible wall extending circumferentially about the axis and extending longitudinally between the first and second open ends. The flexible wall can include an inside surface, an outside surface and a first end surface extending between and connecting the inside and outside surfaces along the second end. An annular reinforcement member can be substantially fully embedded within the flexible wall adjacent the second open end such that the reinforcement member is disposed within the flexible wall in spaced relation to the inside surface, the outside surface and the first end surface thereof. The method can also include providing a retainment element that has an element surface and positioning the retainment element along the flexible wall adjacent the second open end such that the element surface is exposed along at least one of the inside surface, the outside surface and the first end surface of the flexible wall. The method can further include providing a first end member and securing the first end member across the first open end of the flexible sleeve. The method can also include providing a second end member that includes a first side wall extending circumferentially about the axis and generally longitudinally between the first and second ends. The second end member can also include a first end wall disposed along the first end and extending circumferentially about the axis in generally transverse relation to the first side wall. The second end member can further include a second side wall that extends circumferentially about the axis and extends from the first end wall in a direction generally opposite the second end of the second end member. The second side wall can include a radially-outwardly extending retainment ridge at least partially defining a shoulder surface disposed in facing relation to the first end wall. The method can further include positioning the second open end of the flexible wall and the retainment element along the first end of the second end member. The method can also include urging the second open end of the flexible wall and the retainment element in a longitudinal direction onto the second end member until the flexible wall and the retainment element are displaced over the retainment ridge and at least a portion of the outside surface abuttingly engages the first end wall of the second end member with the inside surface of the flexible wall and the exposed element surface of the retainment element are disposed in facing relation to the shoulder surface of the second end member.

Another method of assembling a gas spring in accordance with the subject matter of the present disclosure can include providing a flexible sleeve that includes a flexible wall and a reinforcement member. The flexible wall can have an open end with the reinforcement member substantially fully embedded within the flexible wall adjacent the open end. The method can also include providing at least one retainment element that includes an element surface and positioning the at least one retainment element along the open end of the flexible wall such that the element surface is at least partially exposed therealong. The method can further include providing an end member having a longitudinal axis and including an end wall, a side wall projecting longitudinally from the end wall and a retainment ridge projecting radially outwardly from the side wall. The retainment ridge can include a shoulder surface disposed in facing relation to the end wall and an outer peripheral edge. The method can also include positioning the open end of the flexible wall and the at least one retainment element adjacent the retainment ridge of the end member. The method can further include urging the open end of the flexible wall and the at least one retainment element along the retainment ridge such that at least the open end is forced over the outer peripheral edge of the retainment ridge and such that at least the flexible wall abuttingly engages at least one of the end wall and the side wall of the end member.

DETAILED DESCRIPTION

Figure 1:
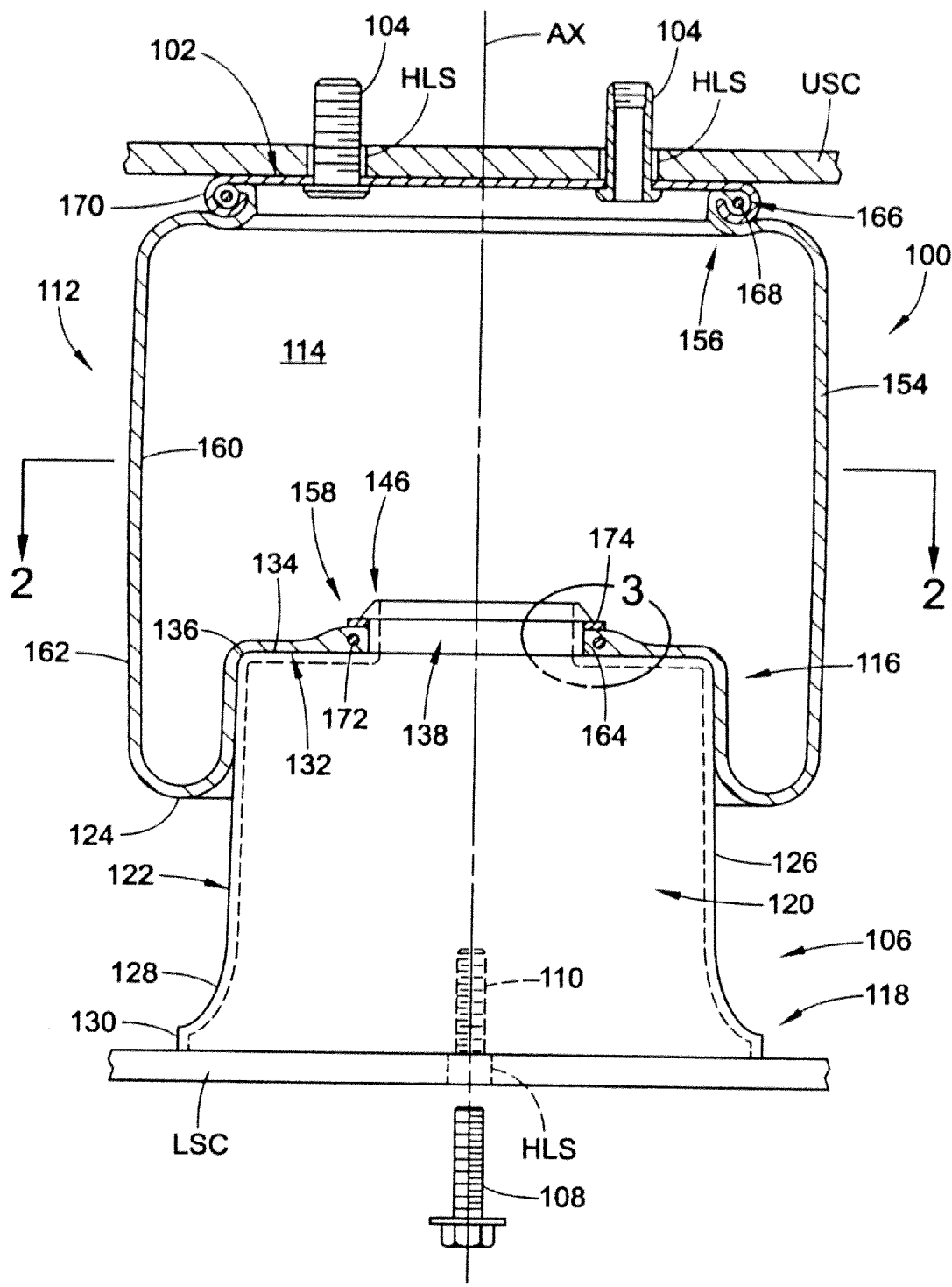
FIG. 1 is a side view, in partial cross section, of one example of a gas spring assembly that includes a flexible sleeve in accordance with the subject matter of the present disclosure.
Figure 2:
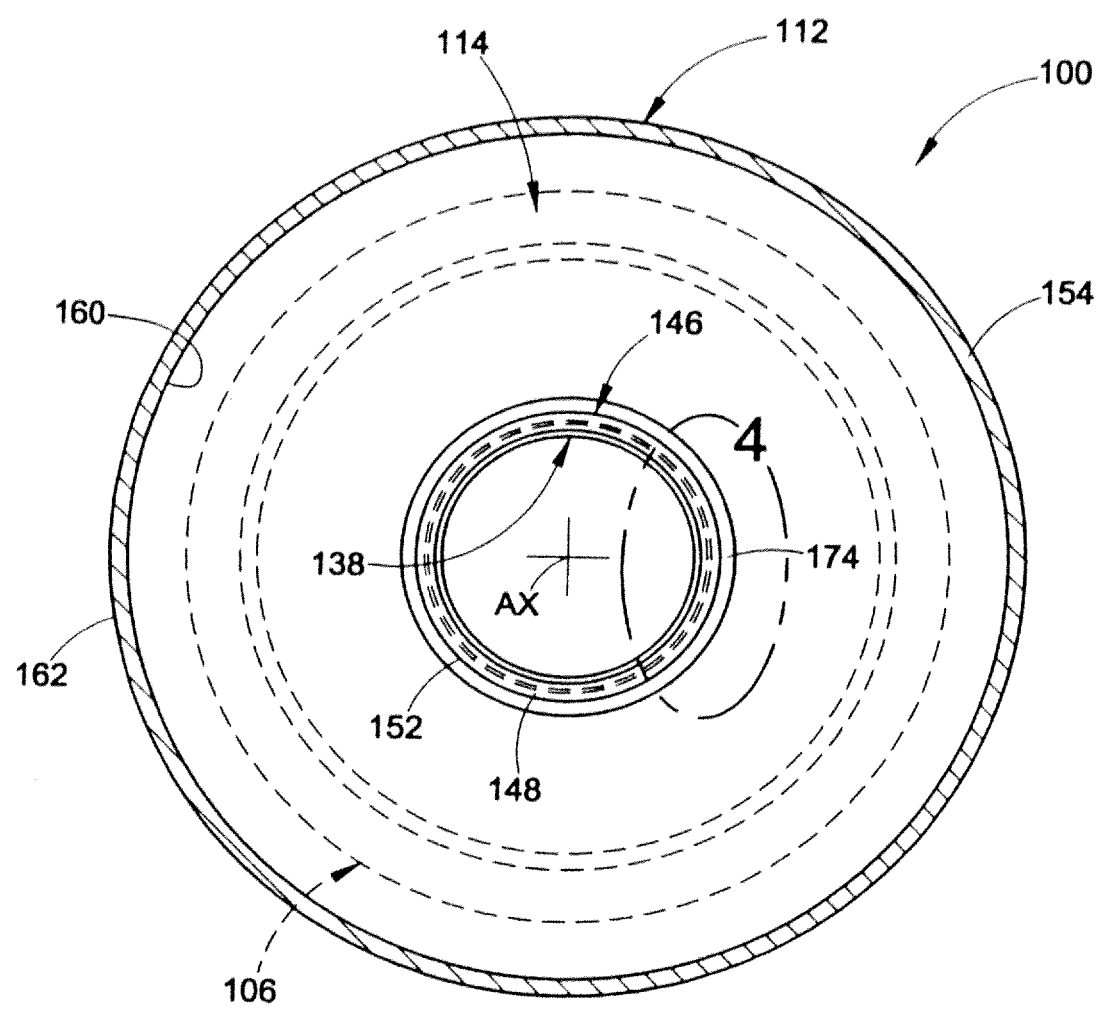
FIG. 2 is a cross-sectional top view of the gas spring assembly in FIG. 1 taken from along line 2-2 thereof.

Turning, now, to the drawings wherein the showings are for the purpose of illustrating examples of the subject matter of the present disclosure and which are not intended as a limitation of the same, FIG. 1 illustrates one example of a gas spring assembly 100 in accordance with the subject matter of the present disclosure that is disposed between opposing structural components, such as upper and lower structural components USC and LSC of an associated vehicle (not shown), for example. Gas spring assembly 100 is shown as having a longitudinal axis AX and including a first end member, such as a top or bead plate 102, for example, that is adapted for securement on or along one of the structural components (e.g., upper structural component USC). It will be appreciated that the first end member can be secured along the structural component in any suitable manner, such as, for example, by using one or more threaded mounting studs 104 that extend through corresponding mounting holes HLS in one of the associated structural components (e.g., upper structural component USC).

Gas spring 100 also includes an opposing second end member, such as a piston 106, for example, that is longitudinally spaced from the first end member and that is adapted for securement on or along a different one of the structural components, such as lower structural component LSC, for example. Again, it will be appreciated that the second end member can be operatively connected to or otherwise secured on or along the structural component in any suitable manner, such as by using one or more threaded fasteners 108 to extend through mounting hole HLS in the associated structural component (e.g., lower structural component LSC) and threadably engage a corresponding mounting feature in the second end member, such as a threaded passage 110, for example.

Gas spring 100 also includes a flexible sleeve or bellows 112 that is operatively connected between the first and second end members and at least partially defines a spring chamber 114 therebetween. In the exemplary arrangement shown in FIGS. 1-5, piston 106 extends longitudinally between a first or upper end 116 and a second or lower end 118. First end 116 is adapted to receive and form a substantially fluid-tight seal with an open end of flexible sleeve 112. Second end 118 of piston 106 is adapted to abuttingly engage an associated structural component, such as lower structural component LSC, for example. Additionally, as discussed above, piston 106 can be secured on or along the associated structural component in any suitable manner, such as by using threaded fastener 108 and threaded passage 110 in combination with one another, for example.

Piston 106 includes a piston body 120 and can also, optionally, include one or more additional components and/or elements, such as one or more threaded inserts, for example. The piston body has a first or outer side wall 122 that extends generally longitudinally between first and second ends 116 and 118. In use, a portion of flexible sleeve 112 forms a rolling-lobe 124 that is displaced along first side wall 122 as the gas spring undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of the piston assembly. As such, it will be appreciated that the profile of first side wall 122 is merely exemplary in that the same includes a first portion 126 having an approximately frustoconical or tapered shape, a second wall portion 128 having a curvilinear shape, and a third portion 130 having an approximately cylindrical shape.

Figure 3:
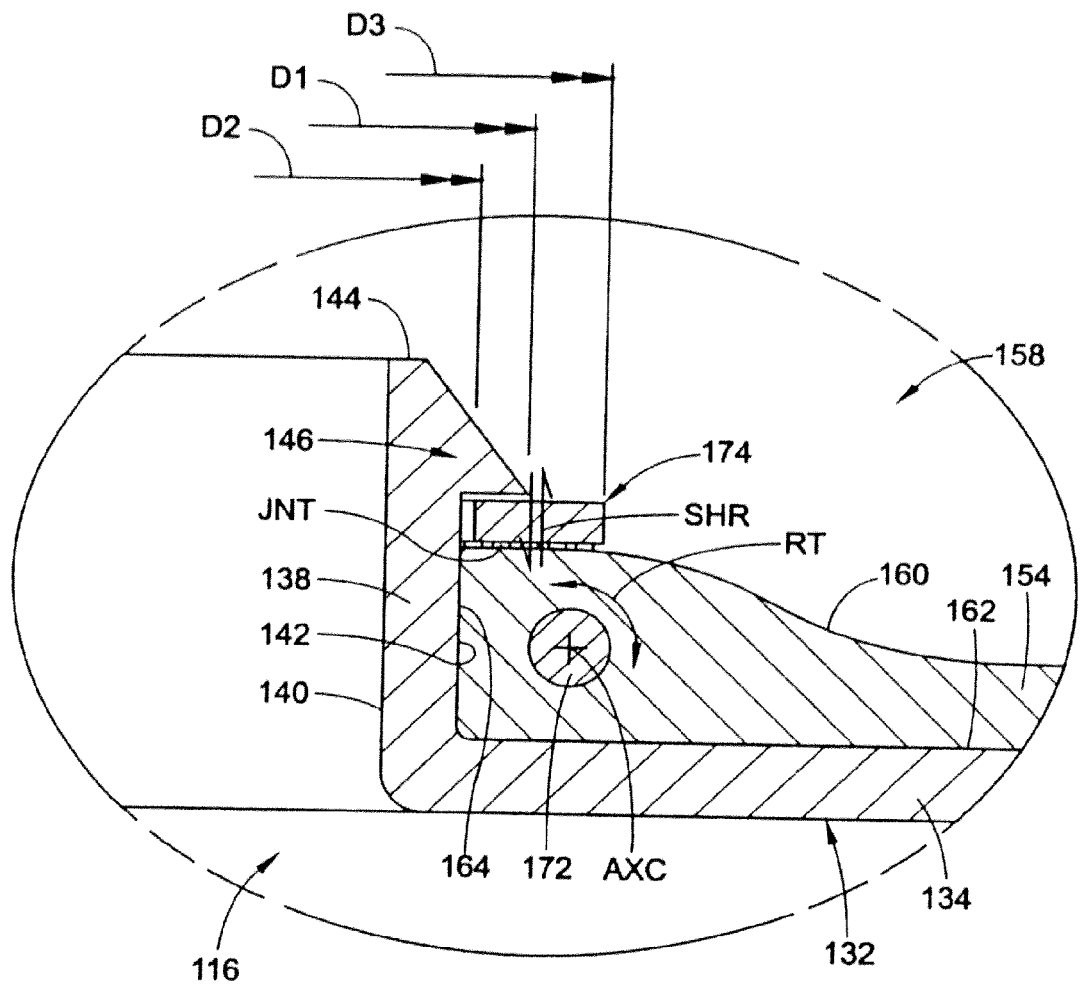
FIG. 3 is an enlarged cross-sectional view of the portion of the flexible sleeve and piston in FIGS. 1 and 2 identified in Detail 3 of FIG. 1.
Figure 5:
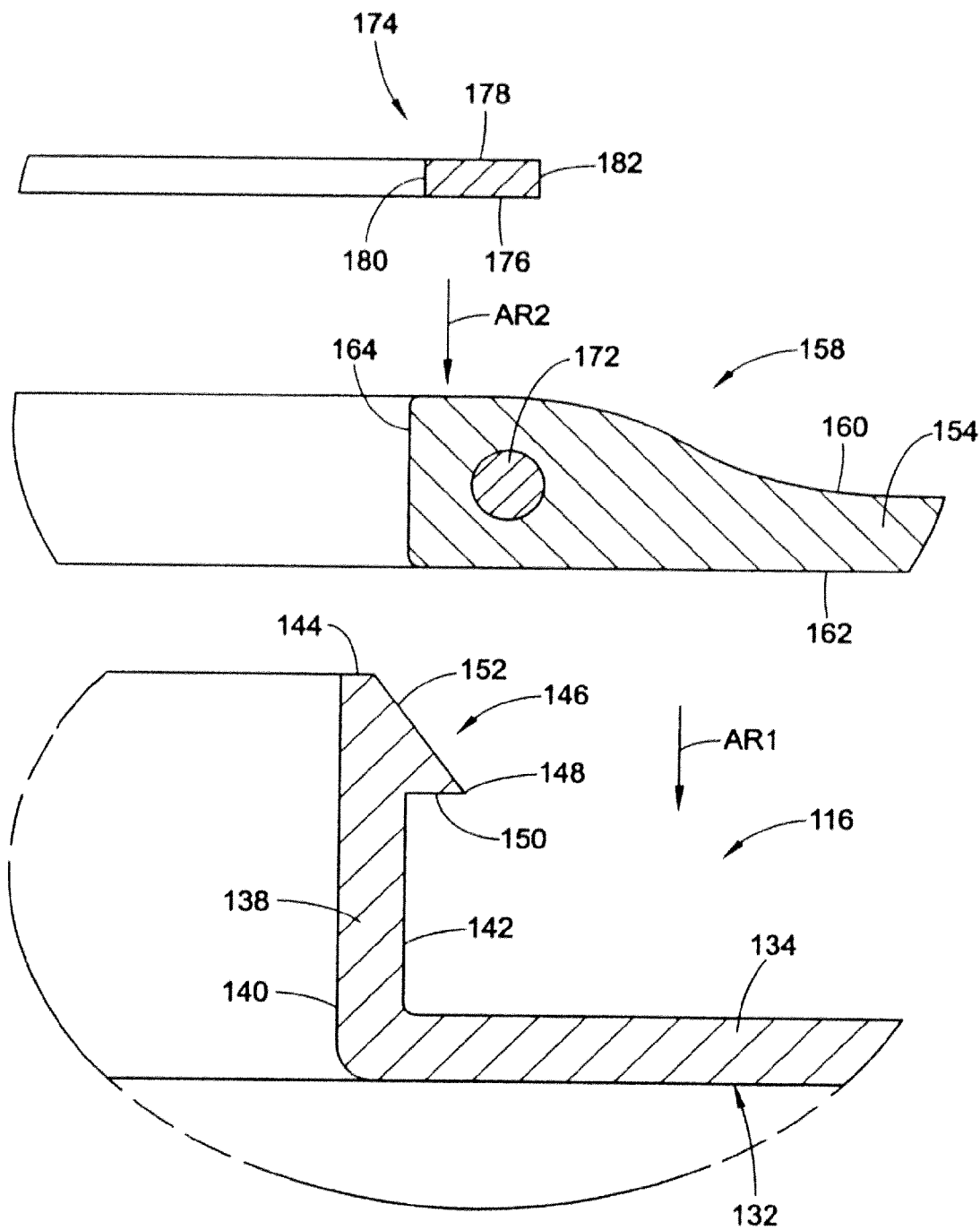
FIG. 5 is an exploded cross-sectional view of the portion of the flexible wall and piston in FIG. 3 prior to assembly.

Piston body 120 also includes a first or upper end wall 132 that extends circumferentially around axis AX and in an orientation that is generally transverse to axis AX and/or a portion of first side wall 122. Additionally, first end wall 132 is shown in FIG. 1 as including an approximately planar portion 134 that transitions into first side wall 122 at a curved or shoulder portion 136. It will be understood, however, that first end wall 132 can take any suitable shape, form and/or configuration. For example, shoulder portion 136 could have a larger or smaller radius and/or portion 134 could be at least partially curved or otherwise contoured. Furthermore, the description of first end wall 132 as extending generally transverse to first side wall 122 is to be broadly interpreted. As one example, first end wall 132 could be approximately perpendicular to first side wall 122, such as is shown in FIGS. 1, 3 and 5, for example. Recognizing, however, that the first side wall and first end wall can take a wide variety of shapes, contours, forms and/or configurations, the term "transverse" should be interpreted as including a wide range of relative angular orientations, such as a range of plus (+) or minus (−) 45 degrees from horizontal or the referenced feature or component, for example.

As shown in FIGS. 1-5, piston body 120 further includes a second or inner side wall 138 that extends circumferentially around axis AX and in an orientation that is generally transverse, as previously defined, to first end wall 132 and/or in an orientation that is approximately aligned with axis AX. Second side wall 138 can take any suitable shape, form and/or configuration. For example, the second side wall can include approximately cylindrical inner and outer surfaces 140 and 142 (FIG. 5). Alternately, the second side wall can have one or more surfaces that are frustoconical, curvilinear and/or otherwise contoured. Additionally, second side wall 138 projects from first end wall 132 in a direction generally opposite second end 118 of piston body 120 and terminates at a second end wall 144 (FIG. 5), which is shown as being approximately planar. However, it will be recognized that any alternate shape, form and/or configuration could be used.

Piston body 120 also includes a retainment ridge 146 that extends circumferentially around axis AX and projects radially-outwardly from second side wall 138. As identified in FIG. 5, retainment ridge 146 includes an outermost edge 148, a shoulder surface 150 and an outer surface 152. Shoulder surface 150 extends circumferentially around axis AX and radially outwardly from outer surface 142 of second side wall 138 to outermost edge 148. Additionally, shoulder surface 150 is disposed in facing relation to first end wall 132 and extends radially outwardly in generally transverse relation, as previously defined, to second side wall 138. While shoulder surface 150 is shown as being substantially continuous, it will be appreciated that a discontinuous or segregated arrangement could alternately be used in which a plurality of circumferentially-spaced shoulder portions are provided. Furthermore, outer surface 152 extends generally circumferentially around axis AX and is oriented along retainment ridge 146 in a direction facing radially outwardly and away from first end wall 132. Outermost edge 148 has a maximum cross-sectional dimension, which is identified in FIG. 3 by reference dimension D1.

Piston body 120 can be formed from any suitable material or combination of materials for providing the desired strength and retention properties of piston 106. Examples of materials that may be suitable for use in forming the piston body can include fiber-reinforced thermoplastics, such as glass (or other) fiber-reinforced polypropylene and glass (or other) fiber-reinforced polyamide, for example, and high-strength (unfilled) thermoplastics, such as polyester, polyethylene and other polyether-based materials or any combination thereof, for example.

In the exemplary arrangement shown in FIGS. 1-5, flexible sleeve 112 includes a flexible wall 154 that extends between opposing first and second open ends 156 and 158. Flexible wall 154 includes an inside surface 160 that is in fluid communication with spring chamber 114 and an outside surface 162 that abuttingly engages piston 106. As can be better seen in FIGS. 3 and 5, flexible wall 154 also includes an end surface 164 that extends between and connects the inside and outside surfaces along second open end 158.

First open end 156 can be secured on or along first end member 102 in any manner suitable for forming a substantially fluid-tight seal therewith. For example, as shown in FIG. 1, flexible sleeve 112 can include a mounting bead 166 formed along first open end 156 that can, optionally, include an annular reinforcement member 168, such as a bead wire, for example, substantially fully embedded therein with first end member 102 secured along or across the first open end of the flexible sleeve by capturing at least a portion of the mounting bead using a crimped edge connection 170.

It will be appreciated that flexible wall 154 can be formed in any suitable manner, such as by using one or more fabric-reinforced, elastomeric plies or layers (not shown) and/or one or more un-reinforced, elastomeric plies or layers (not shown), for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials or two or more grades of the same material could be used. In either case, the elastomeric material or materials from which the plies are formed will have certain material and/or mechanical properties, such as a hardness property, for example.

Flexible sleeve 112 also includes an annular reinforcement member 172, such as a bead wire, for example, that is substantially fully embedded within the flexible wall along second open end 158. In a preferred arrangement, annular reinforcement member 172 is an endless ring that extends circumferentially around axis AX and is substantially fully encapsulated by flexible wall 154 along second open end 158. As such, it will be recognized that reinforcement member 172 is spaced inwardly into flexible wall 154 from inside surface 160, outside surface 162 and end surface 164. Commonly, annular reinforcement members, such as reinforcement member 172, for example, are formed from a material having a substantially higher tensile strength than the elastomeric material forming the flexible wall. Examples of suitable materials include metals, such as steel, for example, and thermoplastics, such as fiber-reinforce thermoplastics and high-strength (un-reinforced) thermoplastics, such as have been described above in connection with piston body 120, for example.

Additionally, gas spring assembly 100 can include a retainment element 174 that is disposed adjacent inside surface 160 of flexible wall 154 along second open end 158. In the exemplary embodiment shown in FIGS. 1-5, retainment element 174 is provided separately from flexible wall 154 and is not integrated with or otherwise embedded therein. However, retainment element 174 can, optionally, be adhered or otherwise secured to the flexible wall, such as may be beneficial for handling and/or assembly purposes, for example. For example, a flowed-material joint, such as is represented by dashed line JNT in FIG. 3, could be used to secure the retainment element on or along the flexible wall.

In use, the retainment element can function, at least in part, to provide resistance to shear forces, such as are represented by arrows SHR (FIG. 3) as well as resistance to rotation of the flexible wall around a circumferential axis AXC of reinforcement member 172, as indicated by arrow RT (FIG. 3). In this manner, the retainment element can assist in reducing deflection, deformation and/or yielding of second open end 158 of flexible wall 154 while under tension load conditions, such as may act or attempt to separate flexible sleeve 112 from the second end member (e.g., piston 106). It will be appreciated that retainment element 174 can be of any size, shape, configuration and/or arrangement that may be suitable for performing or otherwise providing the foregoing or other functions, benefits and/or features.

Figure 4:
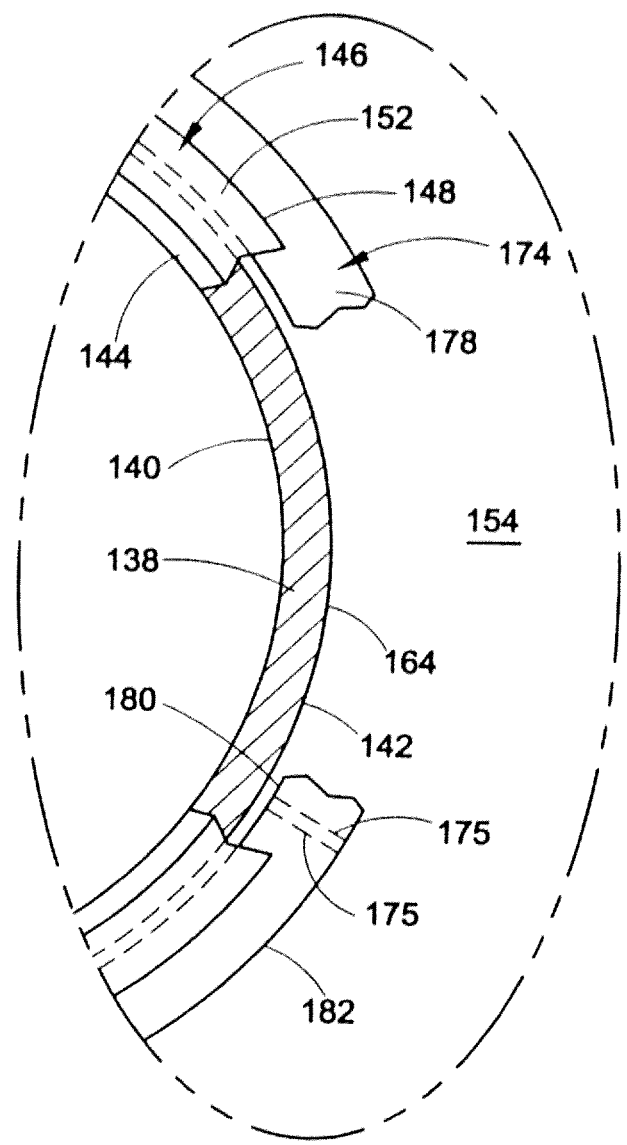
FIG. 4 is a top view, in partial cross section, of the portion of the flexible sleeve and piston in FIGS. 1-3 identified in Detail 4 of FIG. 2.

In the exemplary embodiment shown herein, retainment element 174 takes the form of an annular ring that extends circumferentially about axis AX and has an approximately rectangular cross sectional shape. As stated above, however, it is to be understood that the approximately rectangular cross-sectional shape is merely exemplary and that any other suitable cross-sectional shape could alternately be used, such as circular, oval, square, trapezoidal or parallelogram, for example. Additionally, retainment element 174 can take the form of either an endless annular ring or can take the form of a split ring having two ring end walls, which are represented in FIG. 4 by dashed lines 175.

As identified in FIG. 5, retainment element 174 can extend longitudinally between opposing first and second side surfaces 176 and 178. Retainment element 174 is also shown as including an inside surface 180 that has a cross-sectional inside dimension D2 (FIG. 3) and an outside surface 182 that has a cross-sectional outside dimension D3 (FIG. 3). It will be recognized from FIG. 3 that inside dimension D2 is shown as being less than outside dimension D1 of retainment ridge 146 and that outside dimension D3 of the retainment element is greater than outside dimension D1 of the retainment ridge.

Additionally, it will be appreciated that retainment element 174 can be formed from any material or combination of materials that may be suitable for providing resistance to shear forces and/or resistance to rotation to thereby reduce deflection, deformation and/or yielding of second open end 158 of flexible wall 154, as described above. Examples of such materials can include metal, such as aluminum or steel, for example, plastic, such as fiber-reinforced thermoplastics and high-strength (unreinforced) thermoplastics, for example, rubber, such as natural and/or synthetic rubber, for example, as well as composite materials that can include one or more of the foregoing and/or other materials.

During assembly, second open end 158 of flexible sleeve 112 can be position adjacent outer surface 152 of retainment ridge 146. The flexible wall can then be urged, pressed or otherwise forced over the retainment ridge, as is represented by arrow AR1 in FIG. 5, and into abutting engagement with one or more of first end wall 132 and/or second side wall 138 of piston body 120. Retainment element 174 can then be positioned adjacent the outer surface of retainment ridge 146, as is represented by arrow AR2 in FIG. 5, and urged, pressed or otherwise forced over the retainment ridge and into abutting engagement with at least one of inside surface 160 of flexible wall 154 and shoulder surface 150 of retainment ridge 146. In an alternate arrangement, the flexible wall and retainment element could be urged, pressed or otherwise forced over the retainment ridge during a common action.

FIGS. 6-10 illustrate another example of a gas spring assembly 200 in accordance with the subject matter of the present disclosure that is disposed between opposing structural components, such as upper and lower structural components USC and LSC of an associated vehicle (not shown), for example. Gas spring assembly 200 is shown as having a longitudinal axis AX and including a first end member, such as a top or bead plate 202, for example, that is adapted for securement on or along one of the structural components (e.g., upper structural component USC). It will be appreciated that the first end member can be secured along the structural component in any suitable manner, such as, for example, by using one or more threaded mounting studs 204 that extend through corresponding mounting holes HLS in one of the associated structural components (e.g., upper structural component USC).

Gas spring 200 also includes an opposing second end member, such as a piston 206, for example, that is longitudinally spaced from the first end member and that is adapted for securement on or along a different one of the structural components, such as lower structural component LSC, for example. Again, it will be appreciated that the second end member can be operatively connected to or otherwise secured on or along the structural component in any suitable manner, such as by using one or more threaded fasteners 208 to extend through mounting hole HLS in the associated structural component (e.g., lower structural component LSC) and threadably engage a corresponding mounting feature in the second end member, such as a threaded passage 210, for example.

Gas spring 200 also includes a flexible sleeve or bellows 212 that is operatively connected between the first and second end members and at least partially defines a spring chamber 214 therebetween. In the exemplary arrangement shown in FIGS. 6-10, piston 206 extends longitudinally between a first or upper end 216 and a second or lower end

218. First end 216 is adapted to receive and form a substantially fluid-tight seal with an open end of flexible sleeve 212. Second end 218 of piston 206 is adapted to abuttingly engage an associated structural component, such as lower structural component LSC, for example. Additionally, as discussed above, piston 206 can be secured on or along the associated structural component in any suitable manner, such as by using threaded fastener 208 and threaded passage 210 in combination with one another, for example.

Piston 206 includes a piston body 220 and can also, optionally, include one or more additional components and/or elements, such as one or more threaded inserts, for example. The piston body has a first or outer side wall 222 that extends generally longitudinally between first and second ends 216 and 218. In use, a portion of flexible sleeve 212 forms a rolling-lobe 224 that is displaced along first side wall 222 as the gas spring undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of the piston assembly. As such, it will be appreciated that the profile of first side wall 222 is merely exemplary in that the same includes a first portion 226 having an approximately frustoconical or tapered shape, a second wall portion 228 having a curvilinear shape, and a third portion 230 having an approximately cylindrical shape.

Figure 6:
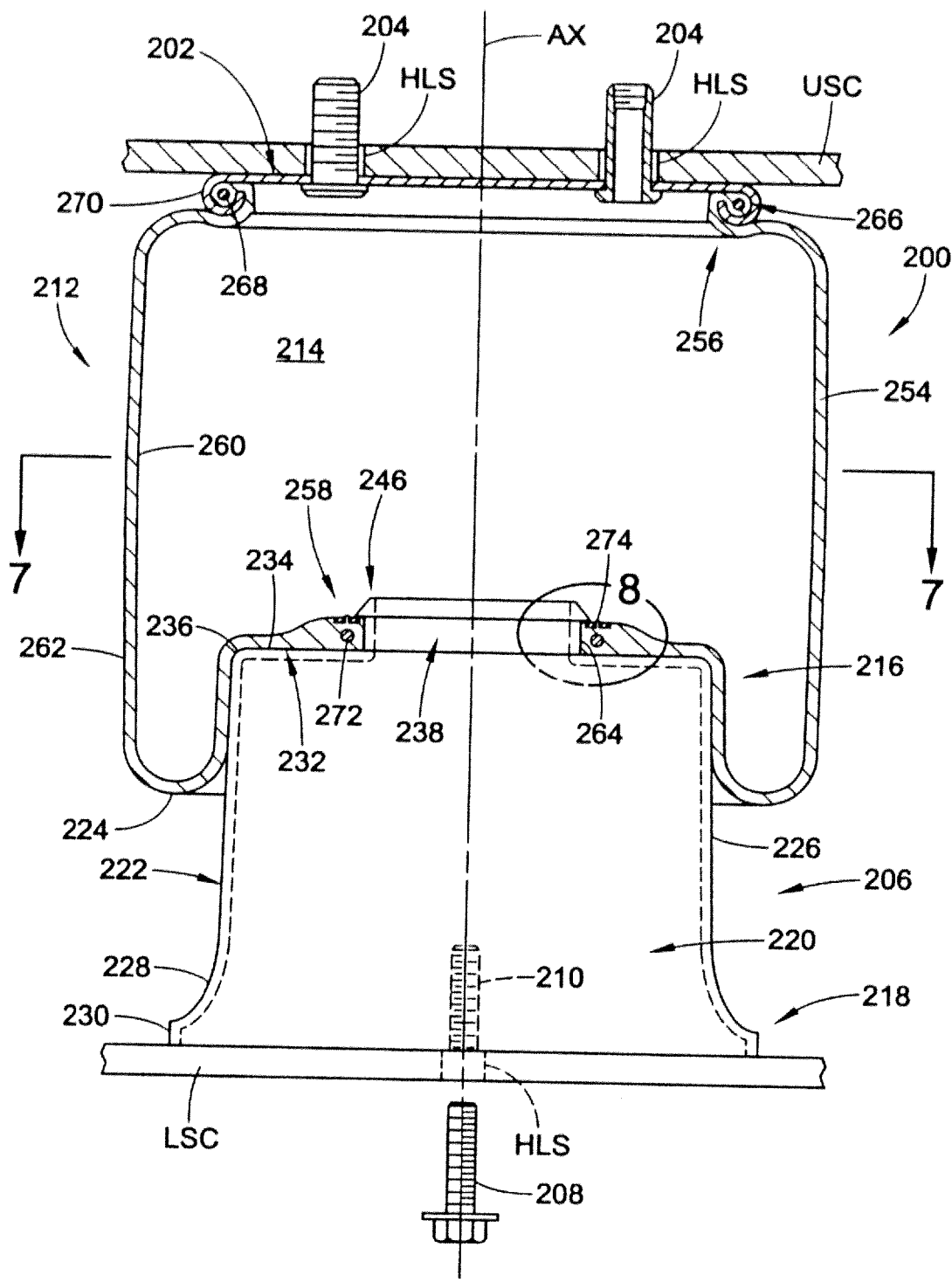
FIG. 6 is a side view, in partial cross section, of another example of a gas spring assembly that includes a flexible sleeve in accordance with the subject matter of the present disclosure.
Figure 7:
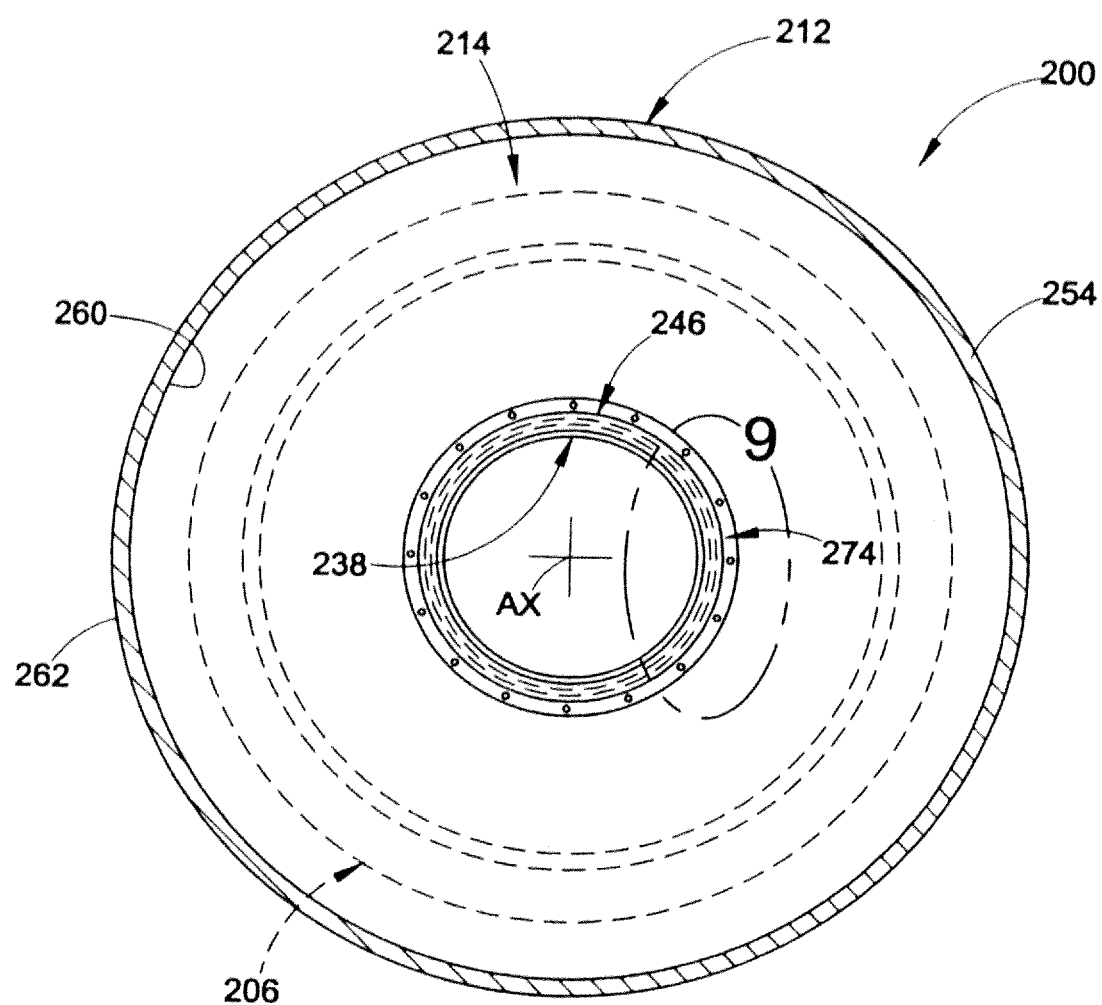
FIG. 7 is a cross-sectional top view of the gas spring assembly in FIG. 6 taken from along line 7-7 thereof.
Figure 8:
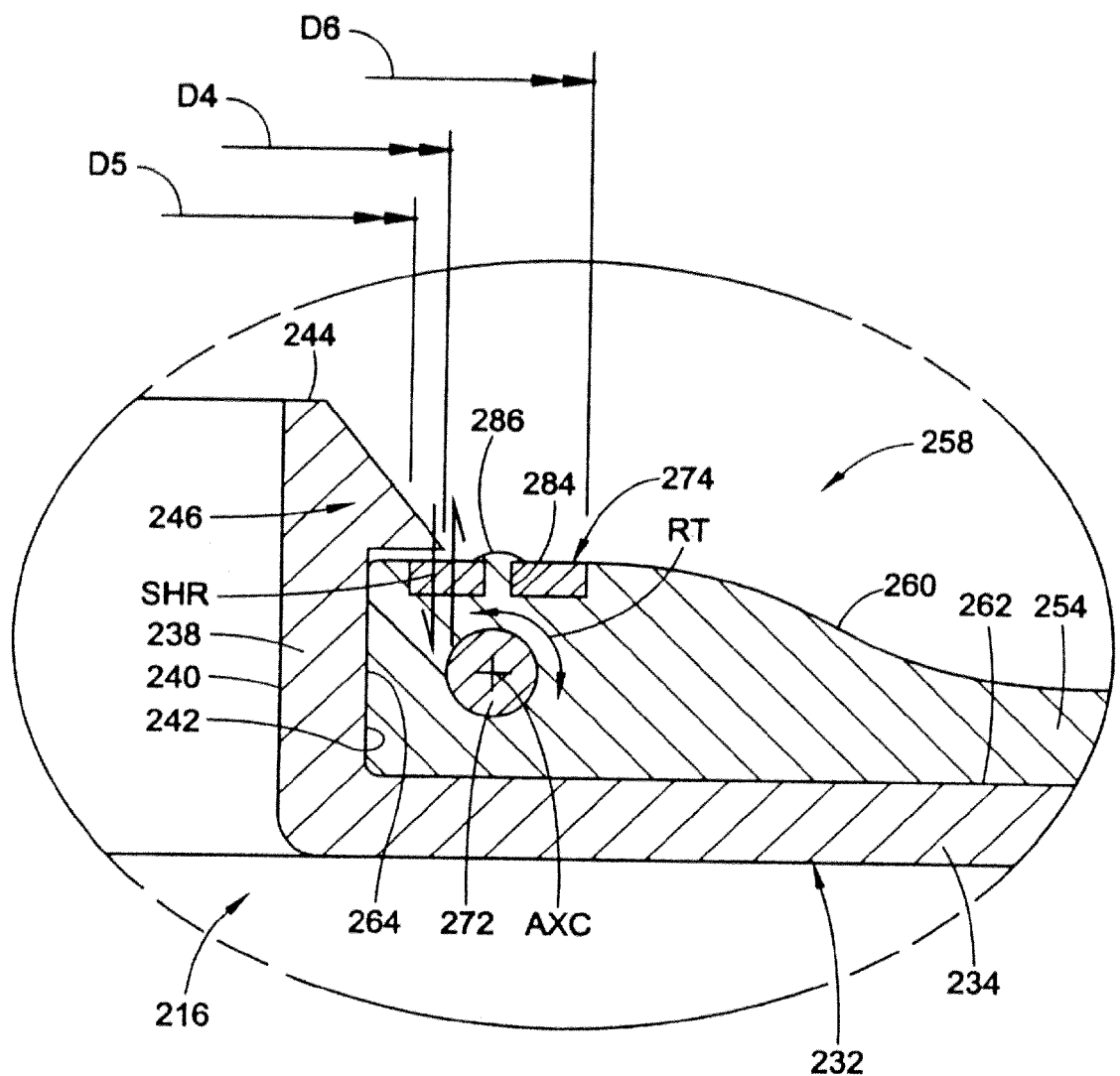
FIG. 8 is an enlarged cross-sectional view of the portion of the flexible sleeve and piston in FIGS. 6 and 7 identified in Detail 8 of FIG. 6.
Figure 10:
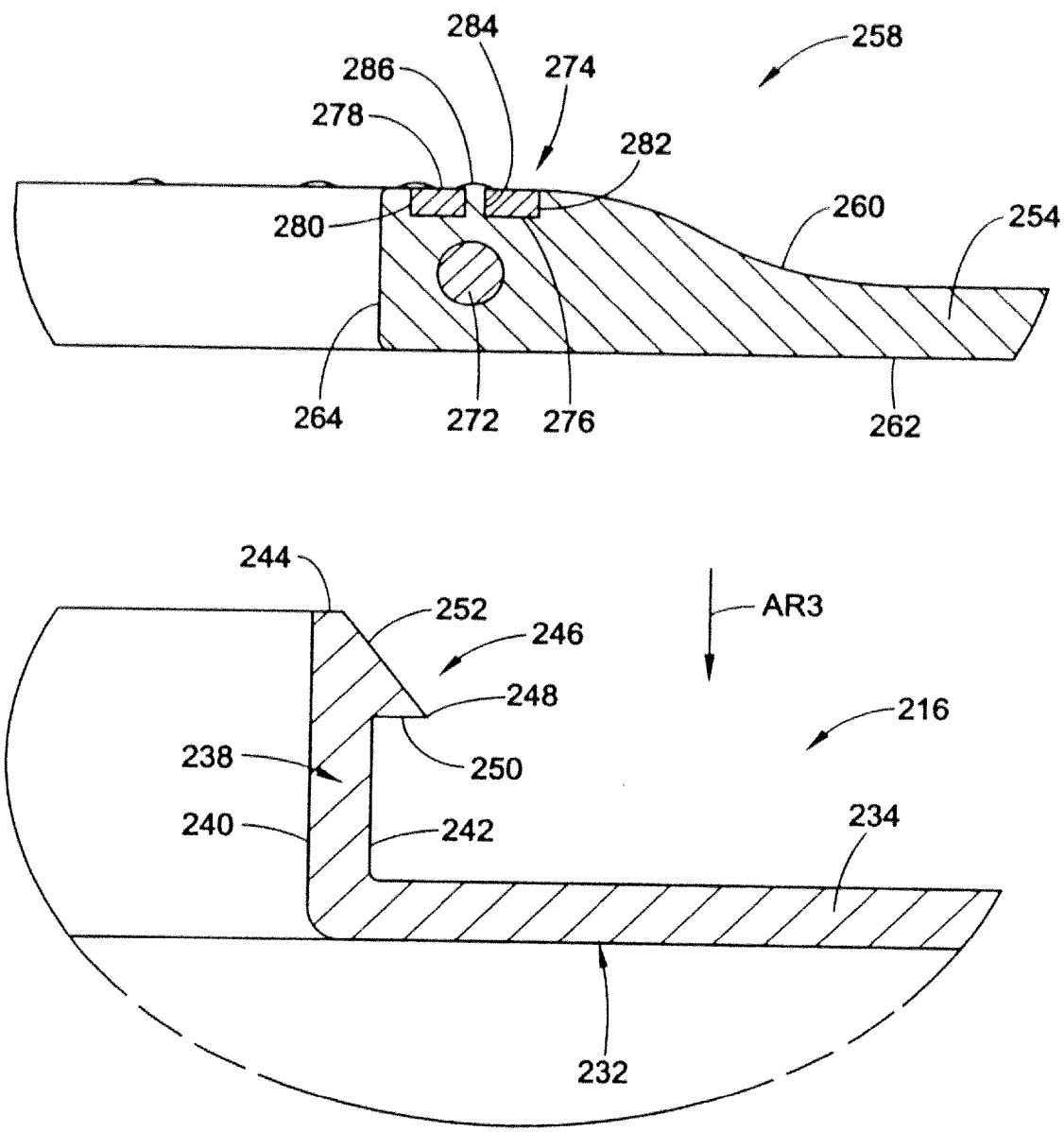
FIG. 10 is an exploded cross-sectional view of the portion of the flexible wall and piston in FIG. 8 prior to assembly.

Piston body 220 also includes a first or upper end wall 232 that extends circumferentially around axis AX and in an orientation that is generally transverse to axis AX and/or a portion of first side wall 222. Additionally, first end wall 232 is shown in FIG. 6 as including an approximately planar portion 234 that transitions into first side wall 222 at a curved or shoulder portion 236. It will be understood, however, that first end wall 232 can take any suitable shape, form and/or configuration. For example, shoulder portion 236 could have a larger or smaller radius and/or portion 234 could be at least partially curved or otherwise contoured. Furthermore, the description of first end wall 232 as extending generally transverse to first side wall 222 is to be broadly interpreted. As one example, first end wall 232 could be approximately perpendicular to first side wall 222, such as is shown in FIGS. 6, 8 and 10, for example. Recognizing, however, that the first side wall and first end wall can take a wide variety of shapes, contours, forms and/or configurations, the term "transverse" should be interpreted as including a wide range of relative angular orientations, such as a range of plus (+) or minus (−) 45 degrees from horizontal or the referenced feature or component, for example.

As shown in FIGS. 6-10, piston body 220 further includes a second or inner side wall 238 that extends circumferentially around axis AX and in an orientation that is generally transverse, as previously defined, to first end wall 232 and/or in an orientation that is approximately aligned with axis AX. Second side wall 238 can take any suitable shape, form and/or configuration. For example, the second side wall can include approximately cylindrical inner and outer surfaces 240 and 242 (FIG. 10). Alternately, the second side wall can have one or more surfaces that are frustoconical, curvilinear and/or otherwise contoured. Additionally, second side wall 238 projects from first end wall 232 in a direction generally opposite second end 218 of piston body 220 and terminates at a second end wall 244 (FIG. 10), which is shown as being approximately planar. However, it will be recognized that any alternate shape, form and/or configuration could be used.

Piston body 220 also includes a retainment ridge 246 that extends circumferentially around axis AX and projects radially-outwardly from second side wall 238. As identified in FIG. 10, retainment ridge 246 includes an outermost edge 248, a shoulder surface 250 and an outer surface 252. Shoulder surface 250 extends circumferentially around axis AX and radially outwardly from outer surface 242 of second side wall 238 to outermost edge 248. Additionally, shoulder surface 250 is disposed in facing relation to first end wall 232 and extends radially outwardly in generally transverse relation, as previously defined, to second side wall 238. While shoulder surface 250 is shown as being substantially continuous, it will be appreciated that a discontinuous or segmented arrangement could alternately be used in which a plurality of circumferentially-spaced shoulder portions are provided. Furthermore, outer surface 252 extends generally circumferentially around axis AX and is oriented along retainment ridge 246 in a direction facing radially outwardly and away from first end wall 232. Outermost edge 248 has a maximum cross-sectional dimension, which is identified in FIG. 8 by reference dimension D4.

Piston body 220 can be formed from any suitable material or combination of materials for providing the desired strength and retention properties of piston 206. Examples of materials that may be suitable for use in forming the piston body can include fiber-reinforced thermoplastics, such as glass (or other) fiber-reinforced polypropylene and glass (or other) fiber-reinforced polyamide, for example, and high-strength (unfilled) thermoplastics, such as polyester, polyethylene and other polyether-based materials or any combination thereof, for example.

In the exemplary arrangement shown in FIGS. 6-10, flexible sleeve 212 includes a flexible wall 254 that extends between opposing first and second open ends 256 and 258. Flexible wall 254 includes an inside surface 260 that is in fluid communication with spring chamber 214 and an outside surface 262 that abuttingly engages piston 206. As can be better seen in FIGS. 8 and 10, flexible wall 254 also includes an end surface 264 that extends between and connects the inside and outside surfaces along second open end 258.

First open end 256 can be secured on or along first end member 202 in any manner suitable for forming a substantially fluid-tight seal therewith. For example, as shown in FIG. 6, flexible sleeve 212 can include a mounting bead 266 formed along first open end 256 that can, optionally, include an annular reinforcement member 268, such as a bead wire, for example, substantially fully embedded therein with first end member 202 secured along or across the first open end of the flexible sleeve by capturing at least a portion of the mounting bead using a crimped edge connection 270.

It will be appreciated that flexible wall 254 can be formed in any suitable manner, such as by using one or more fabric-reinforced, elastomeric plies or layers (not shown) and/or one or more un-reinforced, elastomeric plies or layers (not shown), for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials or two or more grades of the same material could be used. In either case, the elastomeric material or materials from which the plies are formed will have certain material and/or mechanical properties, such as a hardness property, for example.

Flexible sleeve 212 also includes an annular reinforcement member 272, such as a bead wire, for example, that is substantially fully embedded within the flexible wall along second open end 258. In a preferred arrangement, annular reinforcement member 272 is an endless ring that extends circumferentially around axis AX and is substantially fully encapsulated by flexible wall 254 along second open end 258. As such, it will be recognized that reinforcement member 272 is spaced inwardly into flexible wall 254 from inside surface 260, outside surface 262 and end surface 264. Commonly, annular reinforcement members, such as reinforcement member 272, for example, are formed from a material having a substantially higher tensile strength than the elastomeric material forming the flexible wall. Examples of suitable materials include metals, such as steel, for example, and thermoplastics, such as fiber-reinforce thermoplastics and high-strength (un-reinforced) thermoplastics, such as have been described above in connection with piston body 220, for example.

Additionally, one example of a gas spring assembly in accordance with the subject matter of the present disclosure can include a retainment element that is partially embedded within the flexible wall such that at least a portion of one surface of the retainment element is outwardly exposed along a surface of the flexible wall, such as along one or more of the inside surface, the outside surface and/or the end surface, for example. In the exemplary arrangement shown, gas spring assembly 200 includes a retainment element 274 that is partially embedded within flexible wall 254 along inside surface 260 adjacent second open end 258. Retainment element 274 can function, at least in part, to provide resistance to shear forces, such as are represented by arrows SHR (FIG. 8) as well as resistance to rotation of the flexible wall around a circumferential axis AXC of reinforcement member 272, as indicated by arrow RT (FIG. 8). In this manner, the retainment element can assist in reducing deflection, deformation and/or yielding of second open end 258 of flexible wall 254 while under tension load conditions, such as may act or attempt to separate flexible sleeve 212 from the second end member (e.g., piston 206). It will be appreciated that retainment element 274 can be of any size, shape, configuration and/or arrangement that may be suitable for performing or otherwise providing the foregoing or other functions, benefits and/or features.

Figure 9:
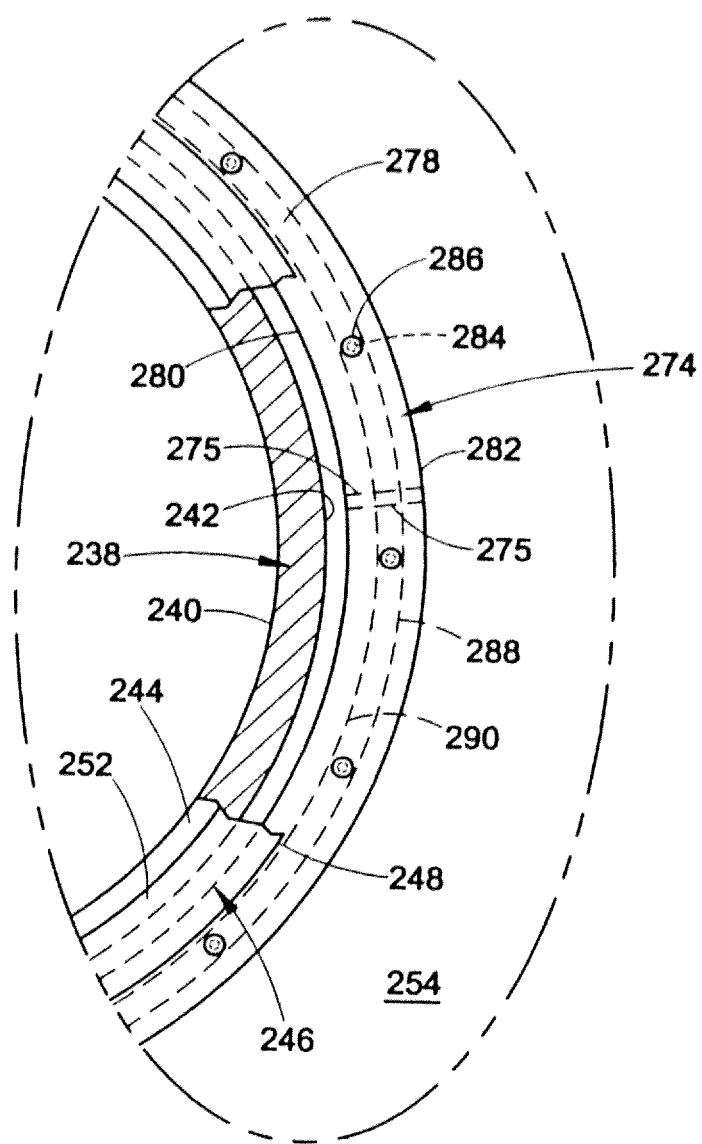
FIG. 9 is a top view, in partial cross section, of the portion of the flexible sleeve and piston in FIGS. 6-8 identified in Detail 9 of FIG. 7.

In the exemplary embodiment shown herein, retainment element 274 takes the form of an annular ring that extends circumferentially about axis AX and has an approximately rectangular cross sectional shape. As stated above, however, it is to be understood that the approximately rectangular cross-sectional shape is merely exemplary and that any other suitable cross-sectional shape could alternately be used, such as circular, oval, square, trapezoidal or parallelogram, for example. Additionally, retainment element 274 can take the form of either an endless annular ring or can take the form of a split ring having two ring end walls, which are represented in FIG. 9 by dashed lines 275.

As identified in FIG. 10, retainment element 274 can extend longitudinally between opposing first and second side surfaces 276 and 278. Retainment element 274 is also shown as including an inside surface 280 that has a cross-sectional inside dimension D5 (FIG. 8) and an outside surface 282 that has a cross-sectional outside dimension D6 (FIG. 8). It will be recognized from FIG. 8 that inside dimension D5 is shown as being less than outside dimension D4 of retainment ridge 246 and that outside dimension D6 of the retainment element is greater than outside dimension D4 of the retainment ridge.

Flexible sleeve 212 and retainment element 274 differ from the arrangement previously described in that retainment element 274 is partially embedded within flexible wall 254 of flexible sleeve 212. For example, the first surface of the retainment element can be entirely embedded within the flexible wall and at least one of the inside and outside surfaces can be at least partially embedded within the flexible wall. In the arrangement shown in FIGS. 6-10, first surface 276 as well as inside and outside surfaces 280 and 282 are substantially fully embedded within the flexible wall material that forms flexible wall 254. Second side surface 278 is shown as being approximately aligned with inside surface 260 and substantially free of the flexible wall material. As such, at least a portion of second side surface 278 can, in the present embodiment, directly abuttingly engage shoulder surface 250 of retainment ridge 246.

Optionally, one or more features can be provided to assist in securing retainment element 274 on or along the flexible wall. In the arrangement shown in FIGS. 6-10, retainment element 274 includes a plurality of holes or passages 284 that extend through the retainment element and are circumferentially spaced from one another around the retainment element. A quantity of flexible wall material can be forced through passages 284 during assembly of flexible sleeve 212 and cured along second side surface 278 to form attachment elements 286. Optionally, some amount of the flexible wall material can extend beyond outside surface 282 and onto second side surface 278, as is represented by dashed line 288 in FIG. 9. Additionally, or in the alternative, some amount of the flexible material can also extend beyond inside surface 280 and onto second side surface 278, as is represented by dashed line 290 in FIG. 9. It will be appreciated that such additional material may be used to assist in securing retainment element 274 on or along the flexible wall in addition to, or as an alternative to, passages 284 and attachment elements 286.

Additionally, it will be appreciated that retainment element 274 can be formed from any material or combination of materials that may be suitable for providing resistance to shear forces and/or resistance to rotation to thereby reduce deflection, deformation and/or yielding of second open end 258 of flexible wall 254, as described above. Examples of such materials can include metal, such as aluminum or steel, for example, plastic, such as fiber-reinforced thermoplastics and high-strength (unreinforced) thermoplastics, for example, rubber, such as natural and/or synthetic rubber, for example, as well as composite materials that can include one or more of the foregoing and/or other materials.

During assembly, second open end 258 of flexible sleeve 212 can be position adjacent outer surface 252 of retainment ridge 246. Flexible wall 254 together with retainment element 274 that is partially embedded therein can then be urged, pressed or otherwise forced over the retainment ridge, as is represented by arrow AR3 in FIG. 10, and into abutting engagement with one or more of first end wall 232 and/or second side wall 238 of piston body 220.

FIGS. 11-16 illustrate a further example of a gas spring assembly 300 in accordance with the subject matter of the present disclosure that is disposed between opposing structural components, such as upper and lower structural components USC and LSC of an associated vehicle (not shown), for example. Gas spring assembly 300 is shown as having a longitudinal axis AX and including a first end member, such as a top or bead plate 302, for example, that is adapted for securement on or along one of the structural components (e.g., upper structural component USC). It will be appreciated that the first end member can be secured along the structural component in any suitable manner, such as, for example, by using one or more threaded mounting studs 304 that extend through corresponding mounting holes HLS in one of the associated structural components (e.g., upper structural component USC).

Gas spring 300 also includes an opposing second end member, such as a piston 306, for example, that is longitudinally spaced from the first end member and that is adapted for securement on or along a different one of the structural components, such as lower structural component LSC, for example. Again, it will be appreciated that the second end member can be operatively connected to or otherwise secured on or along the structural component in any suitable manner, such as by using one or more threaded fasteners 308 to extend through mounting hole HLS in the associated structural component (e.g., lower structural component LSC) and threadably engage a corresponding mounting feature in the second end member, such as a threaded passage 310, for example.

Gas spring 300 also includes a flexible sleeve or bellows 312 that is operatively connected between the first and second end members and at least partially defines a spring chamber 314 therebetween. In the exemplary arrangement shown in FIGS. 11-16, piston 306 extends longitudinally between a first or upper end 316 and a second or lower end 318. First end 316 is adapted to receive and form a substantially fluid-tight seal with an open end of flexible sleeve 312. Second end 318 of piston 306 is adapted to abuttingly engage an associated structural component, such as lower structural component LSC, for example. Additionally, as discussed above, piston 306 can be secured on or along the associated structural component in any suitable manner, such as by using threaded fastener 308 and threaded passage 310 in combination with one another, for example.

Piston 306 includes a piston body 320 and can also, optionally, include one or more additional components and/or elements, such as one or more threaded inserts, for example. The piston body has a first or outer side wall 322 that extends generally longitudinally between first and second ends 316 and 318. In use, a portion of flexible sleeve 312 forms a rolling-lobe 324 that is displaced along first side wall 322 as the gas spring undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of the piston assembly. As such, it will be appreciated that the profile of first side wall 322 is merely exemplary in that the same includes a first portion 326 having an approximately frustoconical or tapered shape, a second wall portion 328 having a curvilinear shape, and a third portion 330 having an approximately cylindrical shape.

Figure 11:
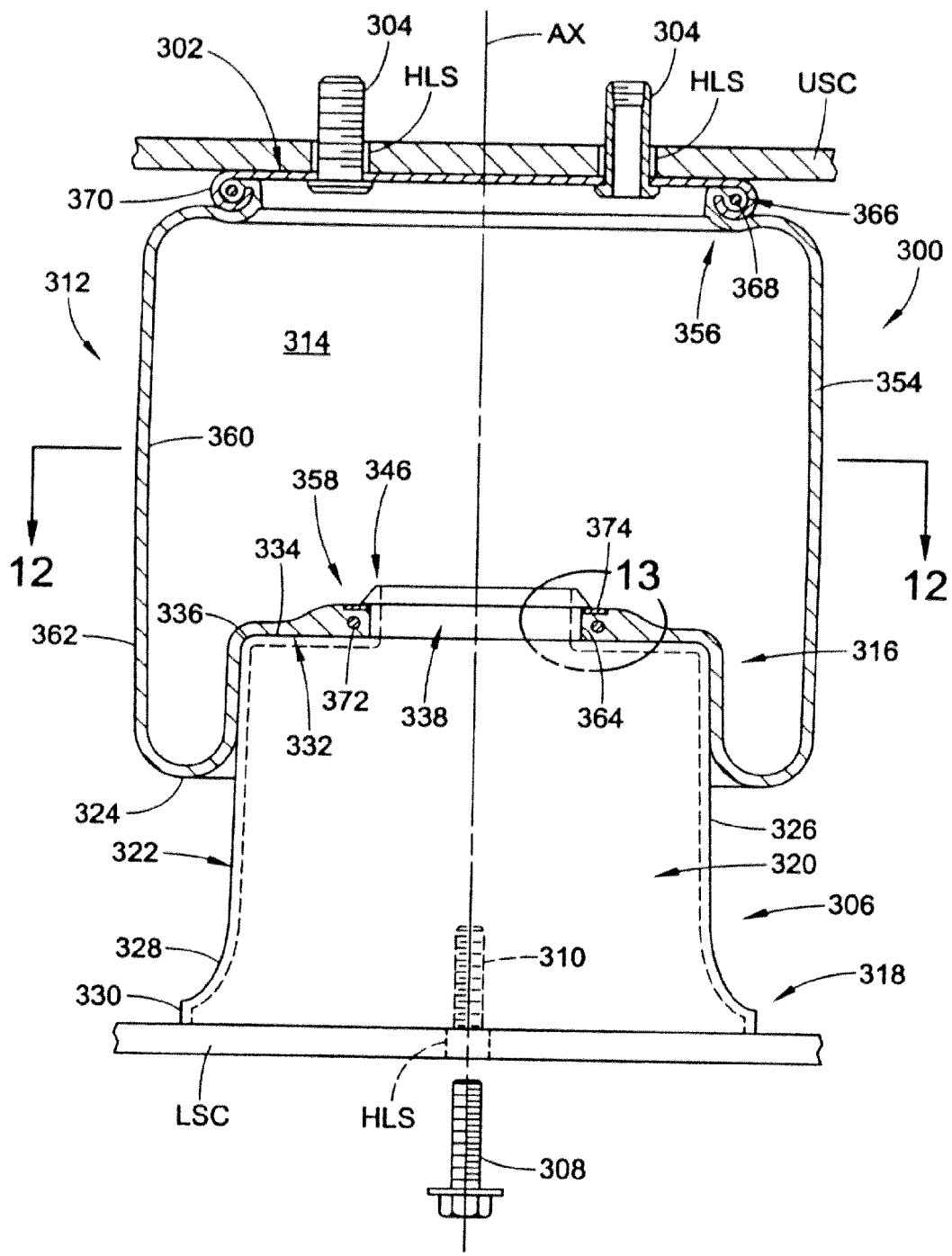
FIG. 11 is a side view, in partial cross section, of a further example of a gas spring assembly that includes a flexible sleeve in accordance with the subject matter of the present disclosure.
Figure 12:
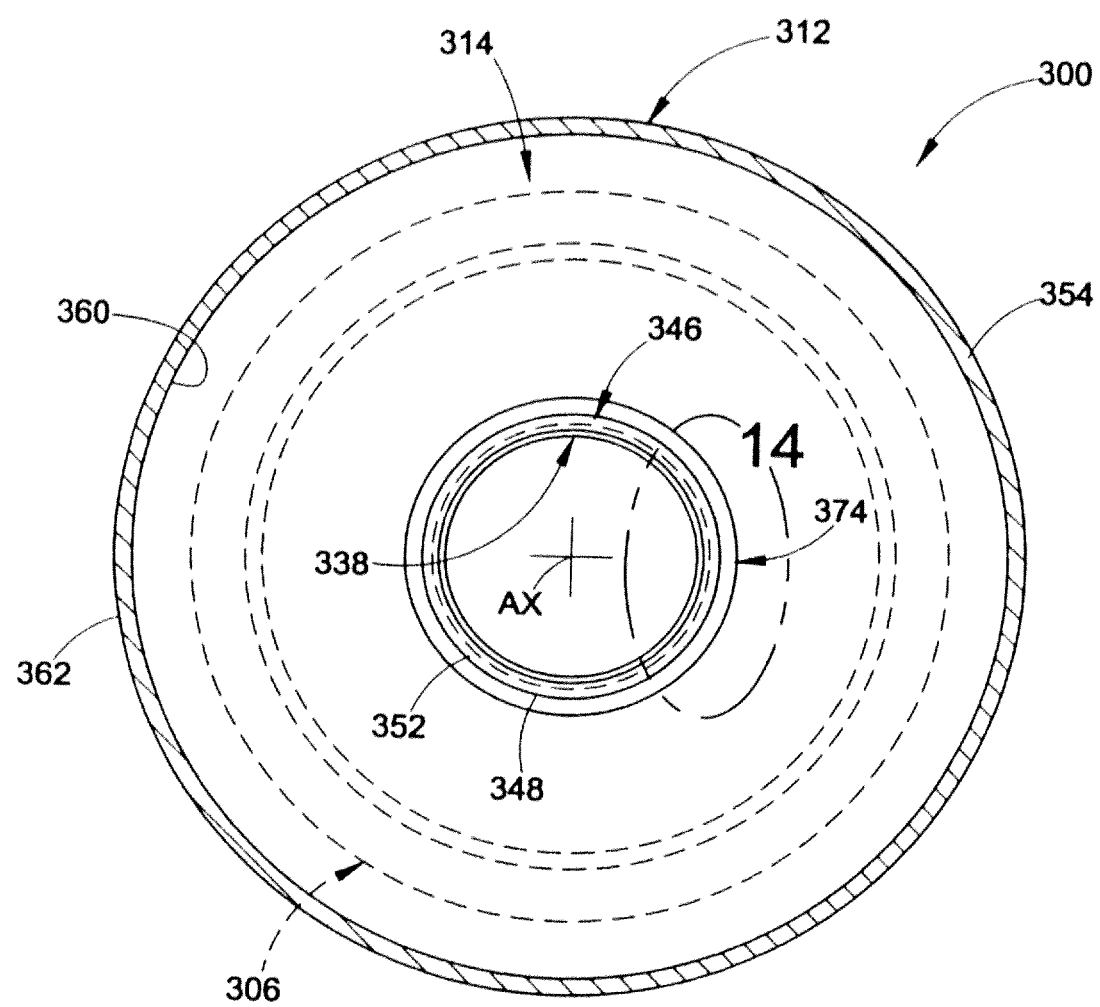
FIG. 12 is a cross-sectional top view of the gas spring assembly in FIG. 11 taken from along line 12-12 thereof.
Figure 13:
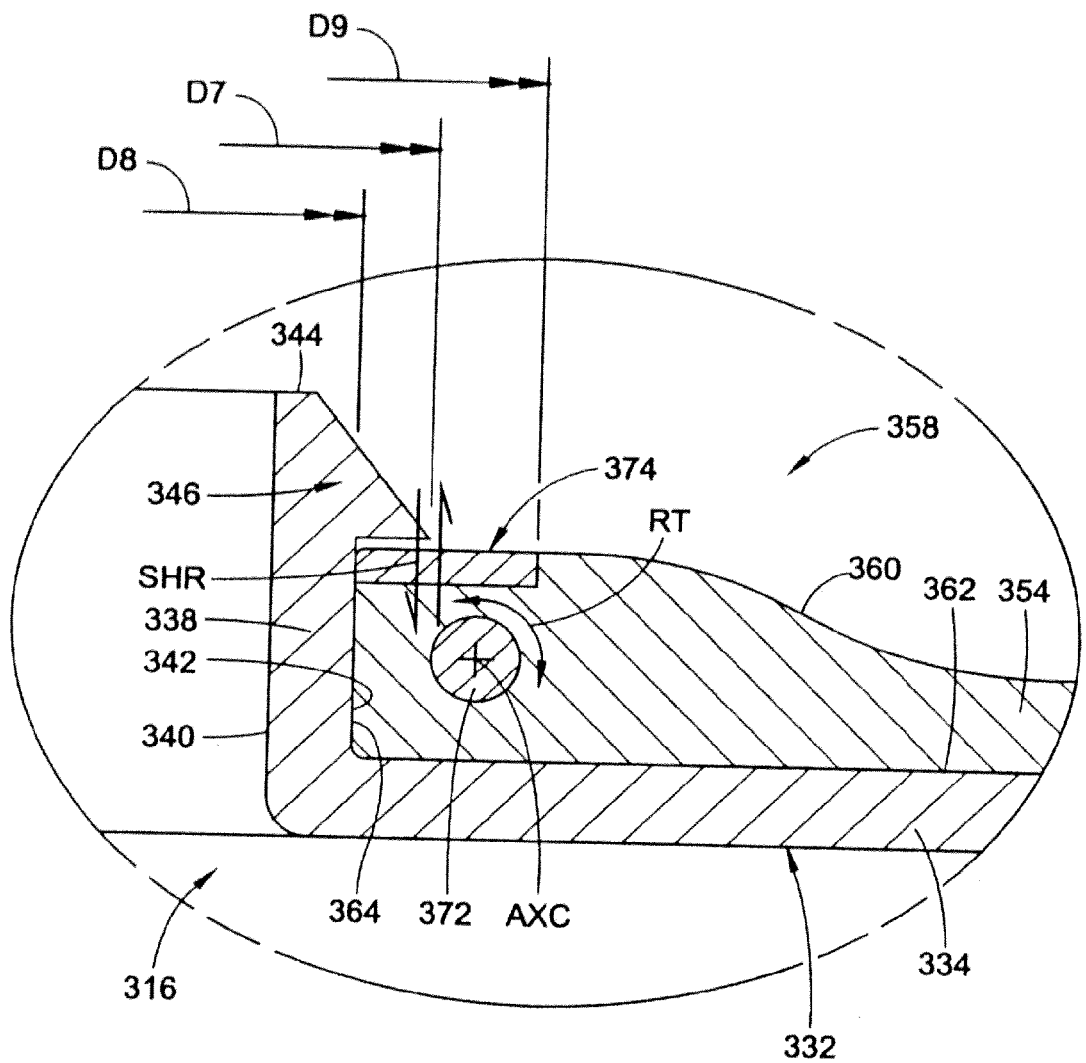
FIG. 13 is an enlarged cross-sectional view of the portion of the flexible sleeve and piston in FIGS. 11 and 12 identified in Detail 13 of FIG. 11.
Figure 16:
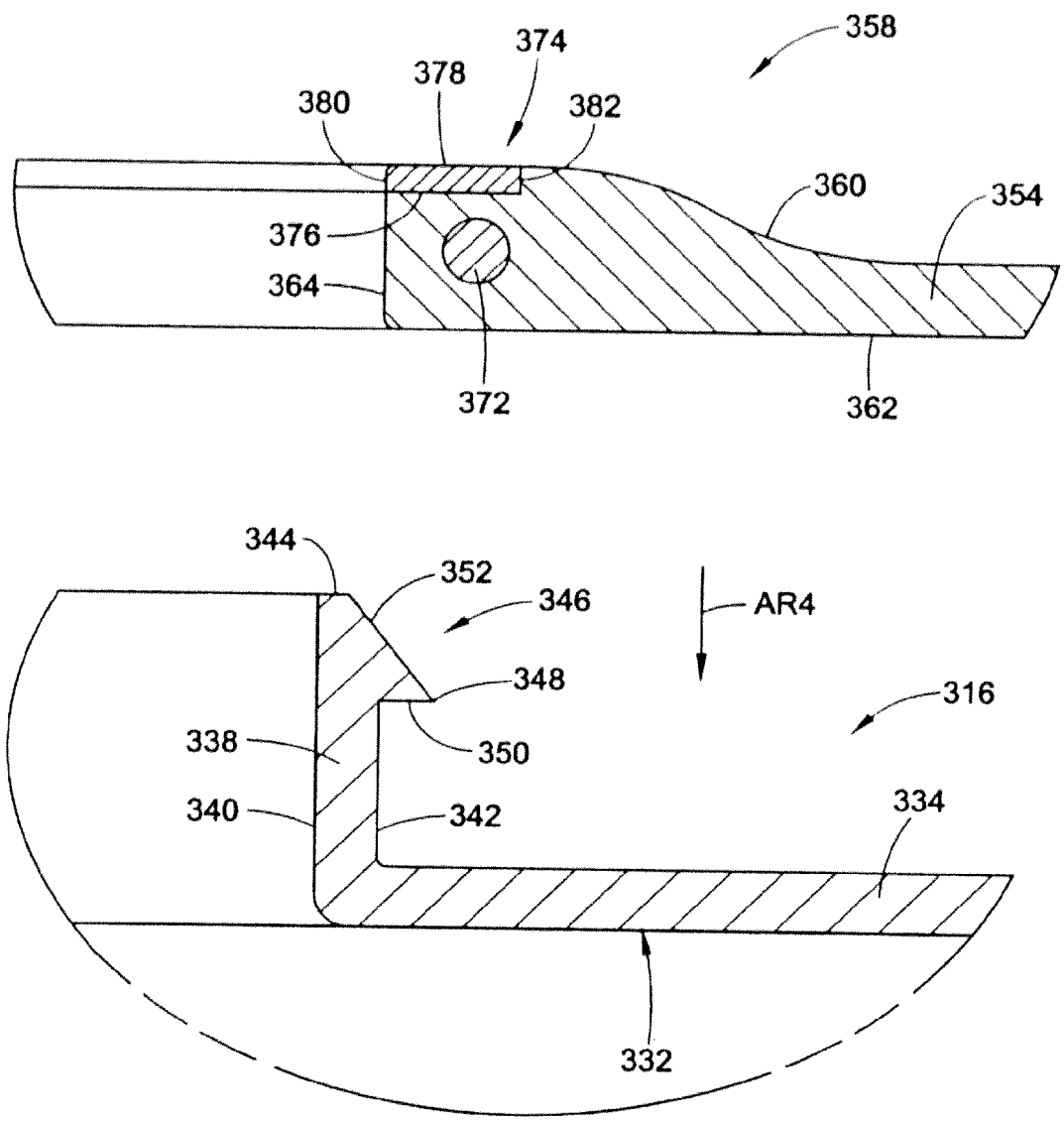
FIG. 16 is an exploded cross-sectional view of the portion of the flexible wall and piston in FIG. 13 prior to assembly.

Piston body 320 also includes a first or upper end wall 332 that extends circumferentially around axis AX and in an orientation that is generally transverse to axis AX and/or at least a portion of first side wall 322. Additionally, first end wall 332 is shown in FIG. 11 as including an approximately planar portion 334 that transitions into first side wall 322 at a curved or shoulder portion 336. It will be understood, however, that first end wall 332 can take any suitable shape, form and/or configuration. For example, shoulder portion 336 could have a larger or smaller radius and/or portion 334 could be at least partially curved or otherwise contoured. Furthermore, the description of first end wall 332 as extending generally transverse to first side wall 322 is to be broadly interpreted. As one example, first end wall 332 could be approximately perpendicular to first side wall 322, such as is shown in FIGS. 11, 13 and 16, for example. Recognizing, however, that the first side wall and first end wall can take a wide variety of shapes, contours, forms and/or configurations, the term "transverse" should be interpreted as including a wide range of relative angular orientations, such as a range of plus (+) or minus (−) 45 degrees from horizontal or the referenced feature or component, for example.

As shown in FIGS. 11-16, piston body 320 further includes a second or inner side wall 338 that extends circumferentially around axis AX and in an orientation that is generally transverse, as previously defined, to first end wall 332 and/or in an orientation that is approximately aligned with axis AX. Second side wall 338 can take any suitable shape, form and/or configuration. For example, the second side wall can include approximately cylindrical inner and outer surfaces 340 and 342 (FIG. 16). Alternately, the second side wall can have one or more surfaces that are frustoconical, curvilinear and/or otherwise contoured. Additionally, second side wall 338 projects from first end wall 332 in a direction generally opposite second end 318 of piston body 320 and terminates at a second end wall 344 (FIG. 16), which is shown as being approximately planar. However, it will be recognized that any alternate shape, form and/or configuration could be used.

Piston body 320 also includes a retainment ridge 346 that extends circumferentially around axis AX and projects radially-outwardly from second side wall 338. As identified in FIG. 16, retainment ridge 346 includes an outermost edge 348, a shoulder surface 350 and an outer surface 352. Shoulder surface 350 extends circumferentially around axis AX and radially outwardly from outer surface 342 of second side wall 338 to outermost edge 348. Additionally, shoulder surface 350 is disposed in facing relation to first end wall 332 and extends radially outwardly in generally transverse relation, as previously defined, to second side wall 338. While shoulder surface 350 is shown as being substantially continuous, it will be appreciated that a discontinuous or segmented arrangement could be used in which a plurality of circumferentially-spaced shoulder portions are alternately provided. Furthermore, outer surface 352 extends generally circumferentially around axis AX and is oriented along retainment ridge 346 in a direction facing radially outwardly and away from first end wall 332. Outermost edge 348 has a maximum cross-sectional dimension, which is identified in FIG. 13 by reference dimension D7.

Piston body 320 can be formed from any suitable material or combination of materials for providing the desired strength and retention properties of piston 306. Examples of materials that may be suitable for use in forming the piston body can include fiber-reinforced thermoplastics, such as glass (or other) fiber-reinforced polypropylene and glass (or other) fiber-reinforced polyamide, for example, and high-strength (unfilled) thermoplastics, such as polyester, polyethylene and other polyether-based materials or any combination thereof, for example.

In the exemplary arrangement shown in FIGS. 11-16, flexible sleeve 312 includes a flexible wall 354 that extends between opposing first and second open ends 356 and 358. Flexible wall 354 includes an inside surface 360 that is in fluid communication with spring chamber 314 and an outside surface 362 that abuttingly engages piston 306. As can be better seen in FIGS. 13 and 16, flexible wall 354 also includes an end surface 364 that extends between and connects the inside and outside surfaces along second open end 358.

First open end 356 can be secured on or along first end member 302 in any manner suitable for forming a substantially fluid-tight seal therewith. For example, as shown in FIG. 11, flexible sleeve 312 can include a mounting bead 366 formed along first open end 356 that can, optionally, include an annular reinforcement member 368, such as a bead wire, for example, substantially fully embedded therein with first end member 302 secured along or across the first open end of the flexible sleeve by capturing at least a portion of the mounting bead using a crimped edge connection 370.

It will be appreciated that flexible wall 354 can be formed in any suitable manner, such as by using one or more fabric-reinforced, elastomeric plies or layers (not shown) and/or one or more un-reinforced, elastomeric plies or layers (not shown), for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials or two or more grades of the same material could be used. In either case, the elastomeric material or materials from which the plies are formed will have certain material and/or mechanical properties, such as a hardness property, for example.

Flexible sleeve 312 also includes an annular reinforcement member 372, such as a bead wire, for example, that is substantially fully embedded within the flexible wall along second open end 358. In a preferred arrangement, annular reinforcement member 372 is an endless ring that extends circumferentially around axis AX and is substantially fully encapsulated by flexible wall 354 along second open end 358. As such, it will be recognized that reinforcement member 372 is spaced inwardly into flexible wall 354 from inside surface 360, outside surface 362 and end surface 364. Commonly, annular reinforcement members, such as reinforcement member 372, for example, are formed from a material having a substantially higher tensile strength than the elastomeric material forming the flexible wall. Examples of suitable materials include metals, such as steel, for example, and thermoplastics, such as fiber-reinforce thermoplastics and high-strength (un-reinforced) thermoplastics, such as have been described above in connection with piston body 320, for example.

Additionally, gas spring assembly 300 can include a retainment element 374 that is partially embedded within flexible wall 354 along inside surface 360 adjacent second open end 358. Retainment element 374 can function, at least in part, to provide resistance to shear forces, such as are represented by arrows SHR (FIG. 13) as well as resistance to rotation of the flexible wall around a circumferential axis AXC of reinforcement member 372, as indicated by arrow RT (FIG. 13). In this manner, the retainment element can assist in reducing deflection, deformation and/or yielding of second open end 358 of flexible wall 354 while under tension load conditions, such as may act or attempt to separate flexible sleeve 312 from the second end member (e.g., piston 306). It will be appreciated that retainment element 374 can be of any size, shape, configuration and/or arrangement that may be suitable for performing or otherwise providing the foregoing or other functions, benefits and/or features.

Figure 14:
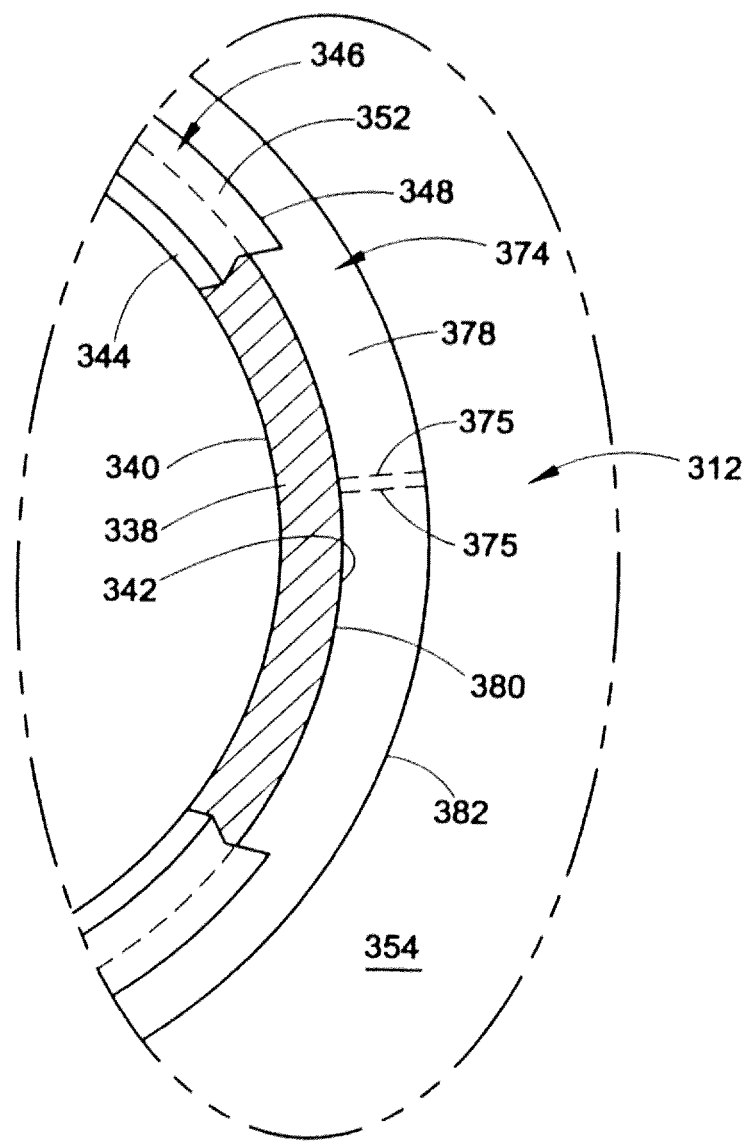
FIG. 14 is a top view, in partial cross section, of the portion of the flexible sleeve and piston in FIGS. 11-13 identified in Detail 14 of FIG. 12.

In the exemplary embodiment shown in FIGS. 10-14 and 16, retainment element 374 takes the form of an annular ring that extends circumferentially about axis AX and has an approximately rectangular cross sectional shape. As stated above, however, it is to be understood that the approximately rectangular cross-sectional shape is merely exemplary and that any other suitable cross-sectional shape could alternately be used, such as circular, oval, square, trapezoidal or parallelogram, for example. Additionally, retainment element 374 can take the form of either an endless annular ring or can take the form of a split ring having two ring end walls, which are represented in FIG. 14 by dashed lines 375.

Figure 15:
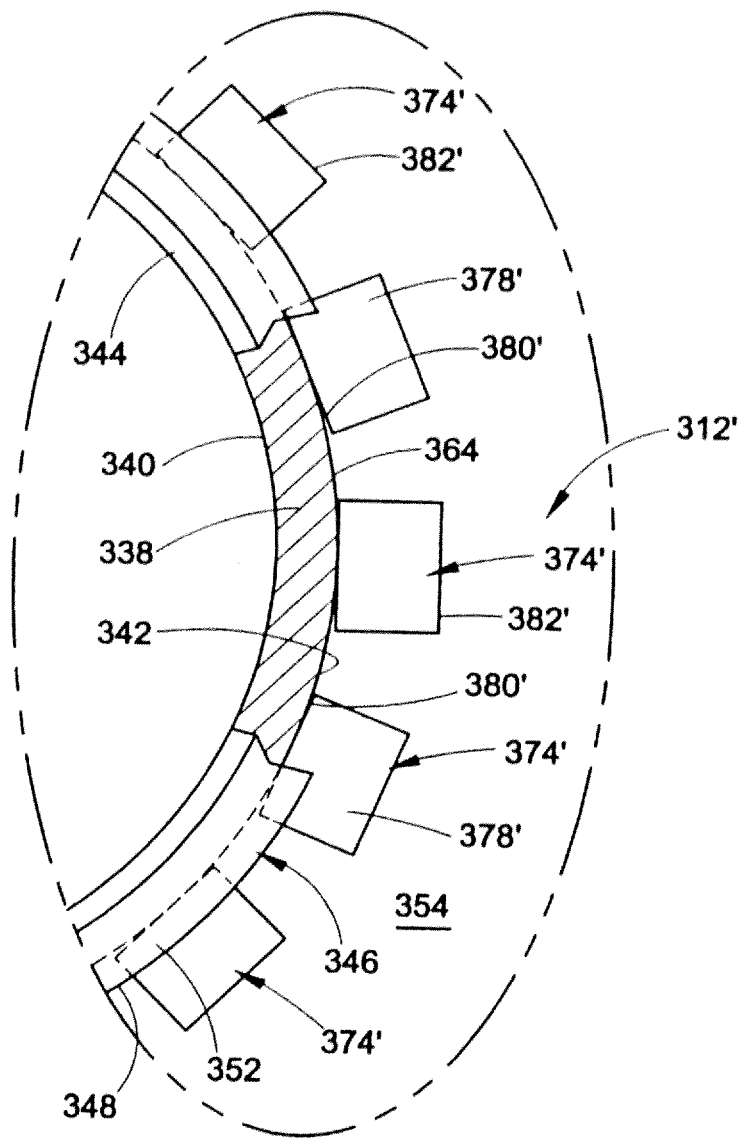
FIG. 15 is a top view, in partial cross section, of an alternate embodiment of the flexible sleeve and piston in FIGS. 11-14.

As identified in FIG. 15, retainment element 374 can extend longitudinally between opposing first and second side surfaces 376 and 378. Retainment element 374 is also shown as including an inside surface 380 that has a cross-sectional inside dimension D8 (FIG. 13) and an outside surface 382 that has a cross-sectional outside dimension D9 (FIG. 13). It will be recognized from FIG. 13 that inside dimension D8 is shown as being less than outside dimension D7 of retainment ridge 346 and that outside dimension D9 of the retainment element is greater than outside dimension D7 of the retainment ridge.

Flexible sleeve 312 and retainment element 374 differ from the arrangements previously described in that retainment element 374 is partially embedded within flexible wall 354 of flexible sleeve 312. Additionally, in the arrangements shown in FIGS. 11-16, first surface 376 as well as outside surface 382 are substantially embedded within the flexible wall material that forms flexible wall 354. Second side surface 378 is shown as being approximately aligned with inside surface 360 and substantially free of the flexible wall material. Additionally, inside surface 380 is shown as being approximately aligned with end surface 364 and is also substantially free of the flexible wall material. As such, at least a portion of second side surface 378 can, in the present embodiment, directly abuttingly engage shoulder surface 350 of retainment ridge 346. Furthermore, inside surface 380 can be disposed adjacent outer surface 342 and can, in some cases, abuttingly engage the same.

An alternate embodiment of flexible sleeve 312 is shown in FIG. 15 and is identified therein as flexible sleeve 312'. Flexible sleeve 312' differs from the flexible sleeve described above in that retainment element 374 is replaced by a plurality of retainment elements 374' that are separate from one another and each of which is partially embedded within the flexible wall. In the exemplary arrangement shown, retainment elements 374' are disposed in circumferentially spaced relation to one another along end surface 364 of flexible wall 354. As such, inside surfaces 380' of the plurality of retainment elements are at least partially exposed and substantially free of the flexible wall material, as described above. Additionally, second side surfaces 378' are approximately aligned with inside surface 360 of flexible wall 354 and, as such, are also at least partially exposed and, thus, substantially free of the flexible wall material. Outside surfaces 382' as well as first side surfaces (not shown) engage the flexible wall material such that the plurality of retainment elements 374' are partially embedded within flexible wall 354 and have at least two exposed outer surfaces.

It will be appreciated that retainment elements 374 and/or 374' can be formed from any material or combination of materials that may be suitable for providing resistance to shear forces and/or resistance to rotation to thereby reduce deflection, deformation and/or yielding of second open end 358 of flexible wall 354, as described above. Examples of such materials can include metal, such as aluminum or steel, for example, plastic, such as fiber-reinforced thermoplastics and high-strength (unreinforced) thermoplastics, for example, rubber, such as natural and/or synthetic rubber, for example, as well as composite materials that can include one or more of the foregoing and/or other materials. It will be appreciated, however, that if metal is used for retainment element 374, a split ring construction having ring end walls 375 can be used to permit the retainment element and the open end in which the same is embedded to expand a sufficient distance to be received over retainment ridge 346.

During assembly, second open end 358 of flexible sleeve 312 can be position adjacent outer surface 352 of retainment ridge 346. Flexible wall 354 together with retainment element 374 that is partially embedded therein can then be urged, pressed or otherwise forced over the retainment ridge, as is represented by arrow AR4 in FIG. 16, and into abutting engagement with one or more of first end wall 332 and/or second side wall 338 of piston body 320.

FIGS. 17-20 illustrate still another example of a gas spring assembly 400 in accordance with the subject matter of the present disclosure that is disposed between opposing structural components, such as upper and lower structural components USC and LSC of an associated vehicle (not shown), for example. Gas spring assembly 400 is shown as having a longitudinal axis AX and including a first end member, such as a top or bead plate 402, for example, that is adapted for securement on or along one of the structural components (e.g., upper structural component USC). It will be appreciated that the first end member can be secured along the structural component in any suitable manner, such as, for example, by using one or more threaded mounting studs 404 that extend through corresponding mounting holes HLS in one of the associated structural components (e.g., upper structural component USC).

Gas spring 400 also includes an opposing second end member, such as a piston 406, for example, that is longitudinally spaced from the first end member and is adapted for securement on or along a different one of the structural components, such as lower structural component LSC, for example. Again, it will be appreciated that the second end member can be operatively connected to or otherwise secured on or along the structural component in any suitable manner, such as by using one or more threaded fasteners 408 to extend through mounting hole HLS in the associated structural component (e.g., lower structural component LSC) and threadably engage a corresponding mounting feature in the second end member, such as a threaded passage 410, for example.

Gas spring 400 also includes a flexible sleeve or bellows 412 that is operatively connected between the first and second end members and at least partially defines a spring chamber 414 therebetween. In the exemplary arrangement shown in FIGS. 17-20, piston 406 extends longitudinally between a first or upper end 416 and a second or lower end 418. First end 416 is adapted to receive and form a substantially fluid-tight seal with an open end of flexible sleeve 412. Second end 418 of piston 406 is adapted to abuttingly engage an associated structural component, such as lower structural component LSC, for example. Additionally, as discussed above, piston 406 can be secured on or along the associated structural component in any suitable manner, such as by using threaded fastener 408 and threaded passage 410 in combination with one another, for example.

Piston 406 includes a piston body 420 and can also, optionally, include one or more additional components and/or elements, such as one or more threaded inserts, for example. The piston body has a first or outer side wall 422 that extends generally longitudinally between first and second ends 416 and 418. In use, a portion of flexible sleeve 412 forms a rolling-lobe 424 that is displaced along first side wall 422 as the gas spring undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of the piston assembly. As such, it will be appreciated that the profile of first side wall 422 is merely exemplary in that the same includes a first portion 426 having an approximately frustoconical or tapered shape, a second wall portion 428 having a curvilinear shape, and a third portion 430 having an approximately cylindrical shape.

Figure 17:
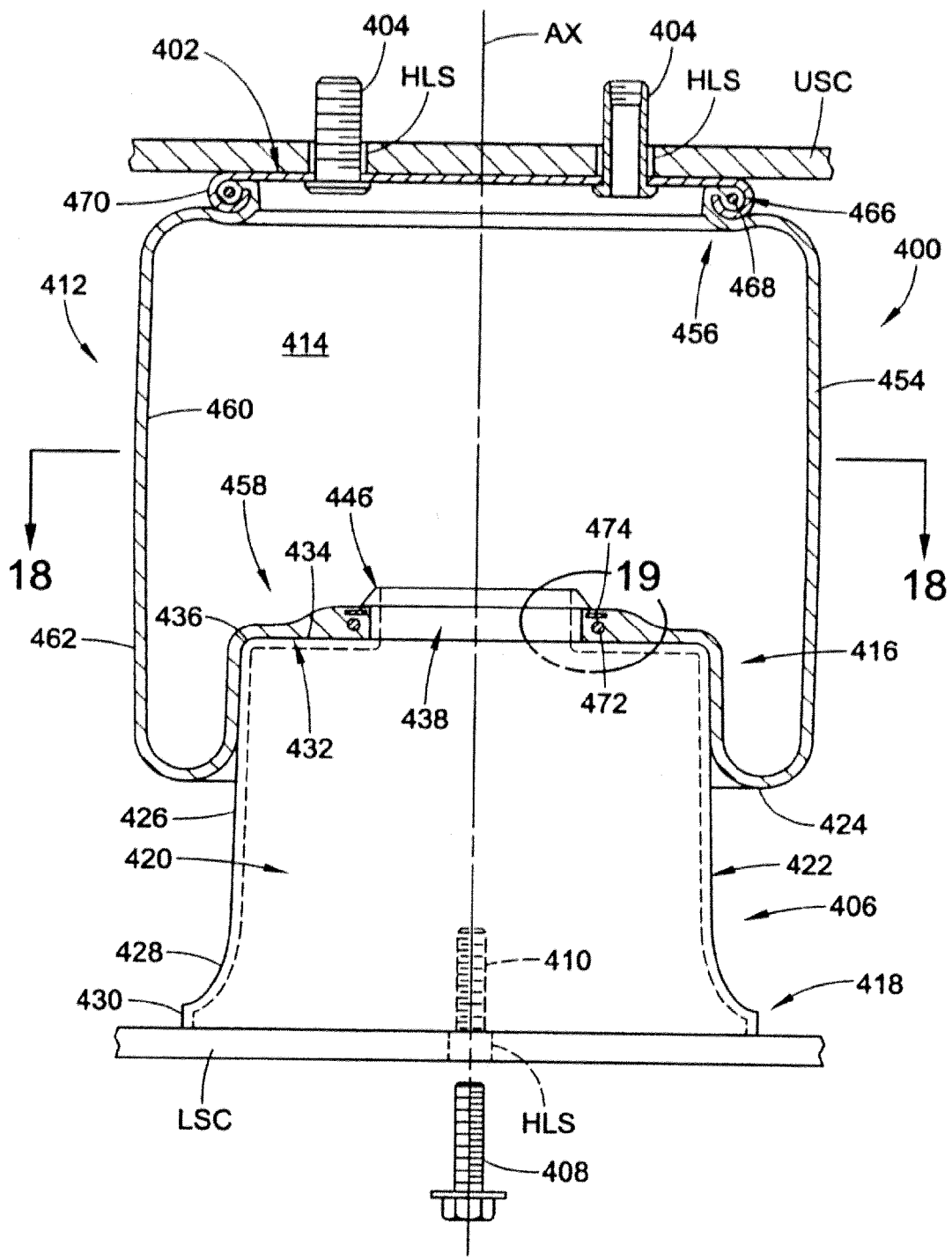
FIG. 17 is a side view, in partial cross section, of still another example of a gas spring assembly that includes a flexible sleeve in accordance with the subject matter of the present disclosure.
Figure 18:
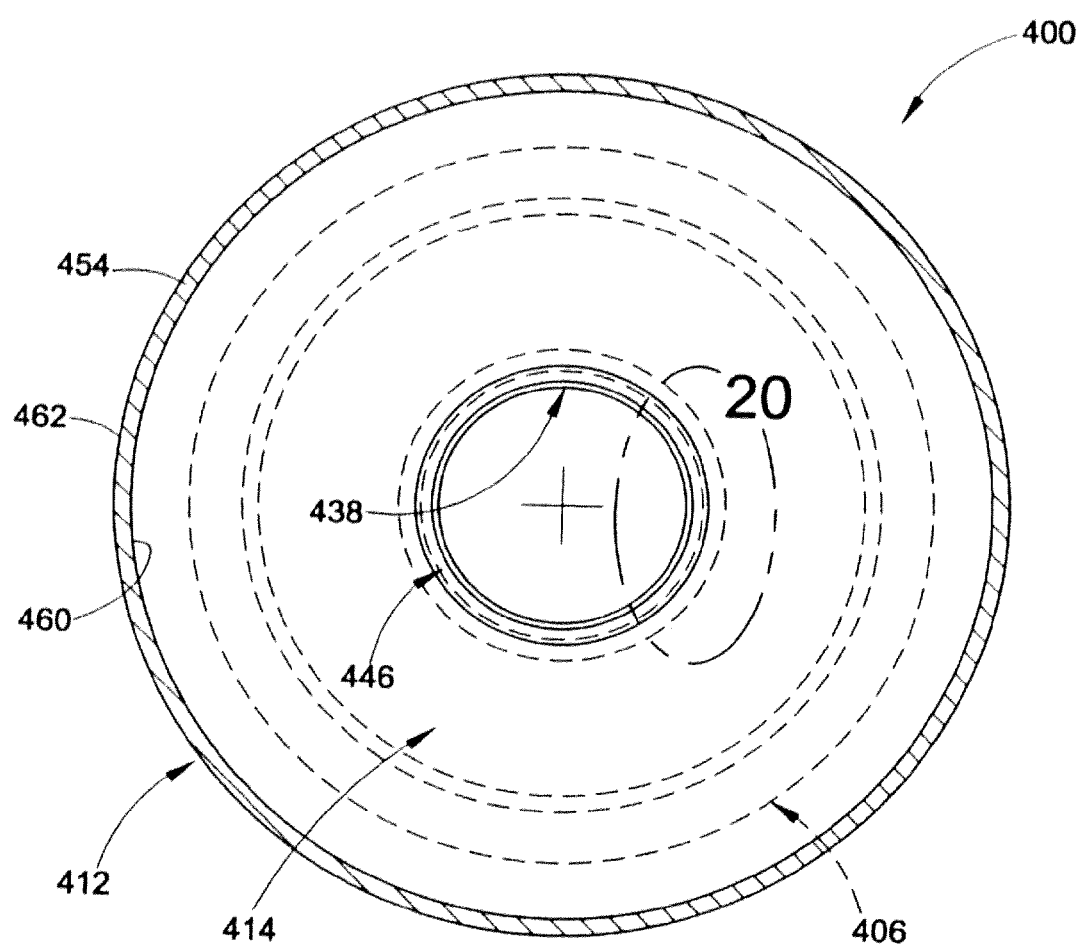
FIG. 18 is a cross-sectional top view of the gas spring assembly in FIG. 17.
Figure 19:
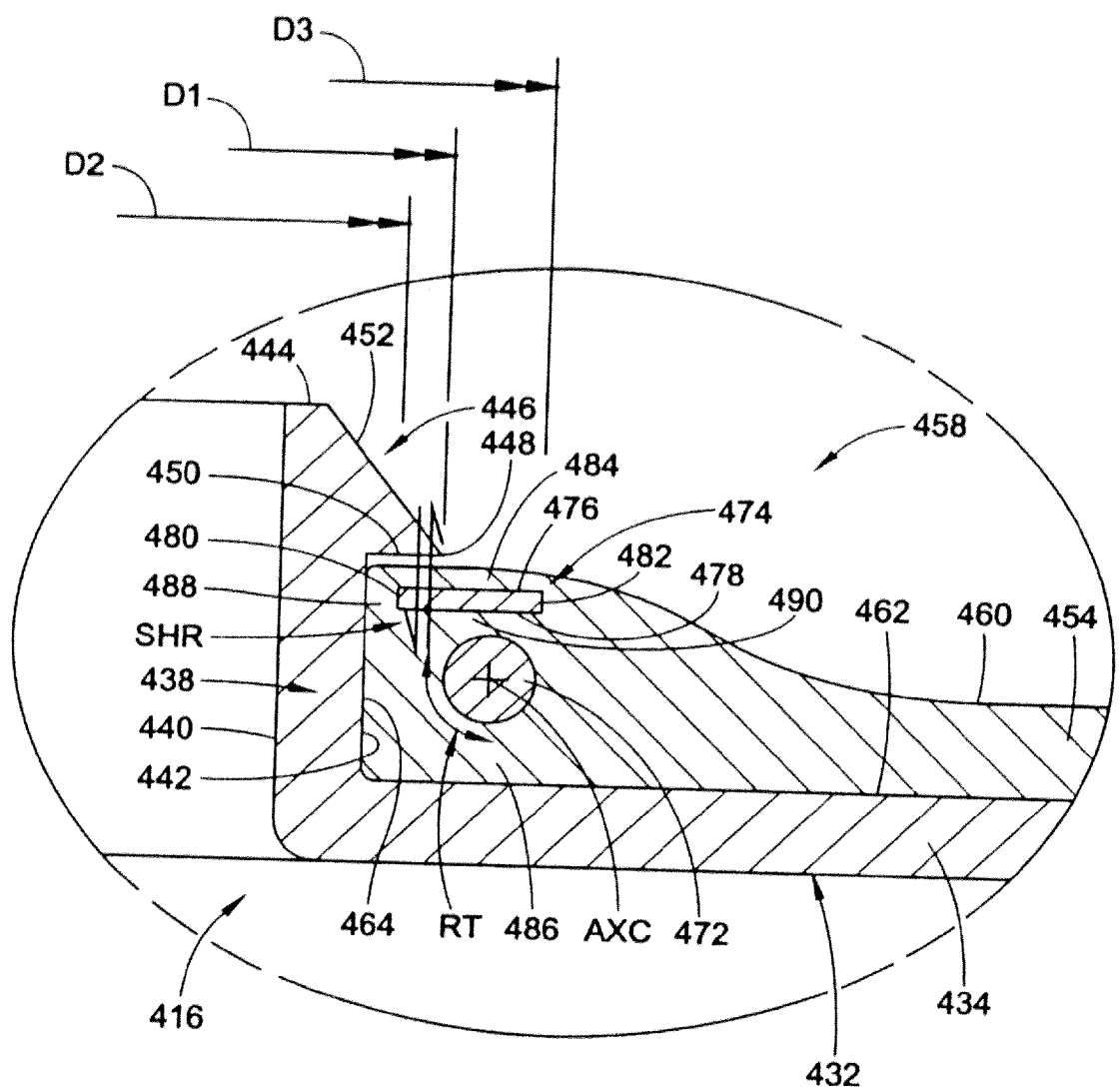
FIG. 19 is an enlarged cross-sectional view of the portion of the flexible sleeve and piston in FIGS. 17 and 18 identified in Detail 19 of FIG. 17.

Piston body 420 also includes a first or upper end wall 432 that extends circumferentially around axis AX and in an orientation that is generally transverse to axis AX and/or a portion of first side wall 422. Additionally, first end wall 432 is shown in FIGS. 17 and 19 as including an approximately planar portion 434 that transitions into first side wall 422 at a curved or shoulder portion 436. It will be understood, however, that first end wall 432 can take any suitable shape, form and/or configuration. For example, shoulder portion 436 could have a larger or smaller radius and/or portion 434 could be at least partially curved or otherwise contoured. Furthermore, the description of first end wall 432 as extending generally transverse to first side wall 422 is to be broadly interpreted. As one example, first end wall 432 could be approximately perpendicular to first side wall 422, such as is shown in FIGS. 17 and 19, for example. Recognizing, however, that the first side wall and first end wall can take a wide variety of shapes, contours, forms and/or configurations, the term "transverse" should be interpreted as including a wide range of relative angular orientations, such as a range of plus (+) or minus (−) 45 degrees from horizontal or the referenced feature or component, for example.

As shown in FIGS. 17-20, piston body 420 further includes a second or inner side wall 438 that extends circumferentially around axis AX and in an orientation that is generally transverse, as previously defined, to first end wall 432 and/or in an orientation that is approximately aligned with axis AX. Second side wall 438 can take any suitable shape, form and/or configuration. For example, the second side wall can include approximately cylindrical inner and outer surfaces 440 and 442 (FIG. 19). Alternately, the second side wall can have one or more surfaces that are frustoconical, curvilinear and/or otherwise contoured. Additionally, second side wall 438 projects from first end wall 432 in a direction generally opposite second end 418 of piston body 420 and terminates at a second end wall 444, which is shown as being approximately planar. However, it will be recognized that any alternate shape, form and/or configuration could be used.

Piston body 420 also includes a retainment ridge 446 that extends circumferentially around axis AX and projects radially-outwardly from second side wall 438. Retainment ridge 446 includes an outermost edge 448, a shoulder surface 450 and an outer surface 452. Shoulder surface 450 extends circumferentially around axis AX and radially outwardly from outer surface 442 of second side wall 438 to outermost edge 448. Additionally, shoulder surface 450 is disposed in facing relation to first end wall 432 and extends radially outwardly in generally transverse relation, as previously defined, to second side wall 438. While shoulder surface 450 is shown as being substantially continuous, it will be appreciated that a discontinuous or segmented arrangement could alternately be used in which a plurality of circumferentially-spaced shoulder portions are provided. Furthermore, outer surface 452 extends generally circumferentially around axis AX and is oriented along retainment ridge 446 in a direction facing radially-outwardly and away from first end wall 432. As shown in FIG. 19, outermost edge 448 has a maximum cross-sectional dimension, which is identified in FIG. 19 by reference dimension D1.

Piston body 420 can be formed from any suitable material or combination of materials for providing the desired strength and retention properties of piston 406. Examples of materials that may be suitable for use in forming the piston body can include fiber-reinforced thermoplastics, such as glass (or other) fiber-reinforced polypropylene and glass (or other) fiber-reinforced polyamide, for example, and high-strength (unfilled) thermoplastics, such as polyester, polyethylene and other polyether-based materials or any combination thereof, for example.

In the exemplary arrangement shown in FIGS. 17-20, flexible sleeve 412 includes a flexible wall 454 that extends between opposing first and second open ends 456 and 458. Flexible wall 454 includes an inside surface 460 that is in fluid communication with spring chamber 414 and an outside surface 462 that abuttingly engages piston 406. As can be better seen in FIG. 19, flexible wall 454 also includes an end surface 464 that extends between and connects the inside and outside surfaces along second open end 458.

First open end 456 can be secured on or along first end member 402 in any manner suitable for forming a substantially fluid-tight seal therewith. For example, as shown in FIG. 17, flexible sleeve 412 can include a mounting bead 466 formed along first open end 456 that can, optionally, include an annular reinforcement member 468, such as a bead wire, for example, substantially fully embedded therein with first end member 402 secured along or across the first open end of the flexible sleeve by capturing at least a portion of the mounting bead using a crimped edge connection 470.

It will be appreciated that flexible wall 454 can be formed in any suitable manner, such as by using one or more fabric-reinforced, elastomeric plies or layers (not shown) and/or one or more un-reinforced, elastomeric plies or layers (not shown), for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials or two or more grades of the same material could be used. In either case, the elastomeric material or materials from which the plies are formed will have certain material and/or mechanical properties, such as a durometer or hardness property, for example.

Flexible sleeve 412 also includes an annular reinforcement member 472, such as a bead wire, for example, that is substantially fully embedded within the flexible wall along second open end 458. In a preferred arrangement, annular reinforcement member 472 is an endless ring that extends circumferentially around axis AX and is substantially fully encapsulated by flexible wall 454 along second open end 458. As such, it will be recognized that reinforcement member 472 is spaced inwardly into flexible wall 454 from inside surface 460, outside surface 462 and end surface 464. Commonly, annular reinforcement members, such as reinforcement member 472, for example, are formed from a material having a substantially higher tensile strength than the elastomeric material forming the flexible wall. Examples of suitable materials include metals, such as steel, for example, and thermoplastics, such as fiber-reinforce thermoplastics and high-strength (un-reinforced) thermoplastics, such as have been described above in connection with piston body 420, for example.

Furthermore, one example of a gas spring assembly in accordance with the subject matter of the present disclosure can include a retainment element that substantially encapsulated or otherwise substantially fully embedded within the flexible wall such that substantially no portion of the retainment element is outwardly exposed along a surface of the flexible wall. As shown in FIGS. 17-20, flexible sleeve 412 further includes a retainment element 474 that is encapsulated or otherwise substantially fully embedded within flexible wall 454 along second open end 458. The retainment element functions, at least in part, to provide resistance to shear forces, such as are represented by arrows SHR (FIG. 19) as well as resistance to rotation of the flexible wall around a circumferential axis AXC of reinforcement member 472, as indicated by arrow RT (FIG. 19). In this manner, the retainment element can assist in reducing deflection, deformation and/or yielding of second open end 458 of flexible wall 454 while under tension load conditions, such as may act or attempt to separate flexible sleeve 412 from the second end member (e.g., piston 406). It will be appreciated that retainment element 474 can be of any size, shape, configuration and/or arrangement that may be suitable for performing the foregoing or other functions, benefits and/or features.

Figure 20:
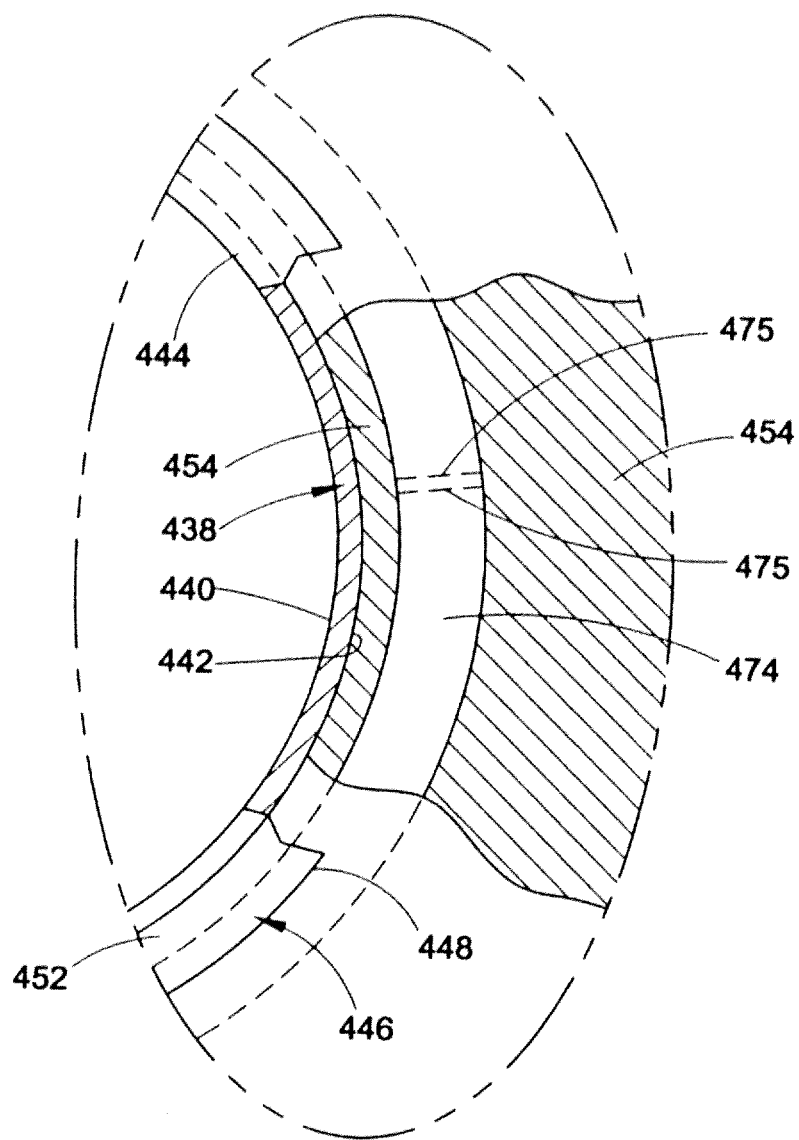
FIG. 20 is a top view, in partial cross section, of the portion of the flexible sleeve and piston in FIGS. 17-19 identified in Detail 20 of FIG. 18.

In the exemplary embodiment shown herein, retainment element 474 takes the form of an annular ring that extends circumferentially about axis AX and has an approximately rectangular cross sectional shape. As stated above, however, it is to be understood that the approximately rectangular cross-sectional shape is merely exemplary and that any other suitable cross-sectional shape could alternately be used, such as circular, oval, square, trapezoidal or parallelogram, for example. Additionally, retainment element 474 can take the form of either an endless annular ring or can take the form of a split ring having two ring end walls, which are represented in FIG. 20 by dashed lines 475.

As shown in FIG. 19, retainment element 474 can extend longitudinally between opposing first and second side surfaces 476 and 478. Retainment element 474 is also shown as including an inside surface 480 that has a cross-sectional inside dimension D2 and an outside surface 482 that has a cross-sectional outside dimension D3. It will be recognized from FIG. 19, that inside dimension D2 is shown as being less than outside dimension D1 of retainment ridge 446 and that outside dimension D3 of the retainment element is greater than outside dimension D1 of the retainment ridge.

Additionally, as shown in FIG. 19, retainment element 474 is substantially fully embedded within flexible wall 454 along second open end 458. As such, the retainment element will be spaced inwardly into the flexible wall in spaced relation to inside surface 460, outside surface 462 and end surface 464. As such, the retainment element is fully encapsulated by the flexible wall and flexible wall material 484, 486 and 488 is respectively disposed between the retainment element and surfaces 460, 462 and 464. Furthermore, retainment element 474 is preferably positioned between reinforcing member 472 and at least one of inside surface 460, outside surface 462 and/or end surface 464. In the exemplary embodiment shown, retainment element 474 is disposed between the reinforcing member and inside surface 462, and is spaced from reinforcement element 472 such that flexible wall material 490 is disposed therebetween. It is to be understood, however, that other arrangements could alternately be used.

Additionally, it will be appreciated that retainment element 474 can be formed from any material or combination of materials that may be suitable for providing resistance to shear forces and/or resistance to rotation to thereby reduce deflection, deformation and/or yielding of second open end 458 of flexible wall 454, as described above. As such, retainment element 474 can be formed from a material having certain material and/or mechanical properties, such as hardness or tensile yield strength, for example. In a preferred arrangement, at least one of the materials from which retainment element 474 is formed will be different from one or more of the elastomeric materials used to form flexible wall 454. In such case, it is anticipated that the differing materials will have different material and/or mechanical properties and, thus, can be selected to provide performance properties and characteristics suitable for providing the functions, benefits and/or features described above.

As one example, flexible wall 454 could be formed from a first material having a first hardness. Retainment element 474 can then be formed from a second material that is different from the first material and has a second hardness. In the present example, the second hardness of the second material can be greater than the first hardness of the first material. Though not universal, it is well understood that certain materials can have strength and other properties that approximately correlate with increasing and decreasing hardness levels of material. As such, the second hardness level of the second material being greater than the first hardness level of the first material could correspond to the second material having a greater tensile strength property than the tensile strength property of the first material. It will be clearly understood, however, that any other properties and/or characteristics of the materials could alternately be used.

One method of assembling a gas spring assembly, such as gas spring assembly 400, for example, can include providing a first end member (e.g., bead plate 402) and providing a second end member (e.g., piston 406). The second end member can include an end wall (e.g., first end wall 432), a side wall (e.g., second side wall 438) extending from the end wall and a retainment ridge (e.g., retainment ridge 446) projecting radially outwardly from the end wall. The retainment ridge can include a shoulder surface (e.g., shoulder surface 450) disposed in facing relation to the end wall and an outer surface (e.g., outer surface 452). The method can further include providing a flexible sleeve (e.g., flexible sleeve 412) having opposing open ends (e.g., first and second open ends 456 and 458) with one of the opposing ends including a retainment element (e.g., retainment element 474) substantially fully embedded therein. The method can also include securing the first end member across the first open end of the flexible sleeve such that a substantially fluid-tight seal is formed therebetween. The method can further include positioning an open end (e.g., second open end 458) of the flexible sleeve adjacent the outer surface of the retainment ridge of the second end member, and urging or otherwise forcing the open end and retainment element over the retainment ridge such that the flexible wall is in abutting engagement with one or more of the end wall and/or side wall of the second end member.

FIGS. 21-25 illustrate still another example of a gas spring assembly 500 in accordance with the subject matter of the present disclosure that is disposed between opposing structural components, such as upper and lower structural components USC and LSC of an associated vehicle (not shown), for example. Gas spring assembly 500 is shown as having a longitudinal axis AX and including a first end member, such as a top or bead plate 502, for example, that is adapted for securement on or along one of the structural components (e.g., upper structural component USC). It will be appreciated that the first end member can be secured along the structural component in any suitable manner, such as, for example, by using one or more threaded mounting studs 504 that extend through corresponding mounting holes HLS in one of the associated structural components (e.g., upper structural component USC).

Gas spring 500 also includes an opposing second end member, such as a piston assembly 506, for example, that is longitudinally spaced from the first end member and that is adapted for securement on or along a different one of the structural components, such as lower structural component LSC, for example. Again, it will be appreciated that the second end member can be operatively connected to or otherwise secured on or along the structural component in any suitable manner, such as by using one or more threaded fasteners 508 to extend through mounting holes HLS in the associated structural component (e.g., lower structural component LSC) and threadably engage a corresponding mounting feature in the second end member, such as a threaded passage 510, for example.

Gas spring 500 also includes a flexible sleeve or bellows 512 that is operatively connected between the first and second end members and at least partially defines a spring chamber 514 therebetween. In the exemplary arrangement shown in FIG. 21, flexible sleeve 512 includes a flexible wall 516 that extends between opposing first and second open ends 518 and 520. It will be appreciated that flexible wall 516 can be formed in any suitable manner, such as by using one or more fabric-reinforced, elastomeric plies or layers (not shown) and/or one or more un-reinforced, elastomeric plies or layers (not shown), for example. Additionally, it will be appreciated that first open end 518 can be secured on or along first end member 502 in any manner suitable for forming a substantially fluid-tight seal therewith. For example, flexible sleeve 512 can include a mounting bead 522 formed along first open end 518 that includes an annular reinforcement member 524, such as a bead wire, for example, embedded therein with first end member 502 secured along or across the first open end of the flexible sleeve by capturing at least a portion of the mounting bead using a crimped edge connection 526.

Piston assembly 506 extends longitudinally between a first or upper end 528 and a second or lower end 530. First end 528 is adapted to receive and form a substantially fluid-tight seal with second open end 520 of flexible sleeve 512. Second end 530 of piston assembly 506 is adapted to abuttingly engage an associated structural component, such as lower structural component LSC, for example. Additionally, as discussed above, piston assembly 506 can be secured on or along the associated structural component in any suitable manner, such as by using threaded fastener 508 and threaded passage 510, for example.

Piston assembly 506 includes a piston body 532 that has a first or outer side wall 534 that extends generally longitudinally between first and second ends 528 and 530. In use, flexible wall 516 of flexible sleeve 512 forms a rolling-lobe 536 that is displaced along first side wall 534 as the gas spring undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of the piston assembly. As such, it will be appreciated that the profile of first side wall 534 is merely exemplary in including a first portion 538 having an approximately frustoconical or tapered shape, a second wall portion 540 having a curvilinear shape, and a third portion 542 having an approximately cylindrical shape.

Figure 21:
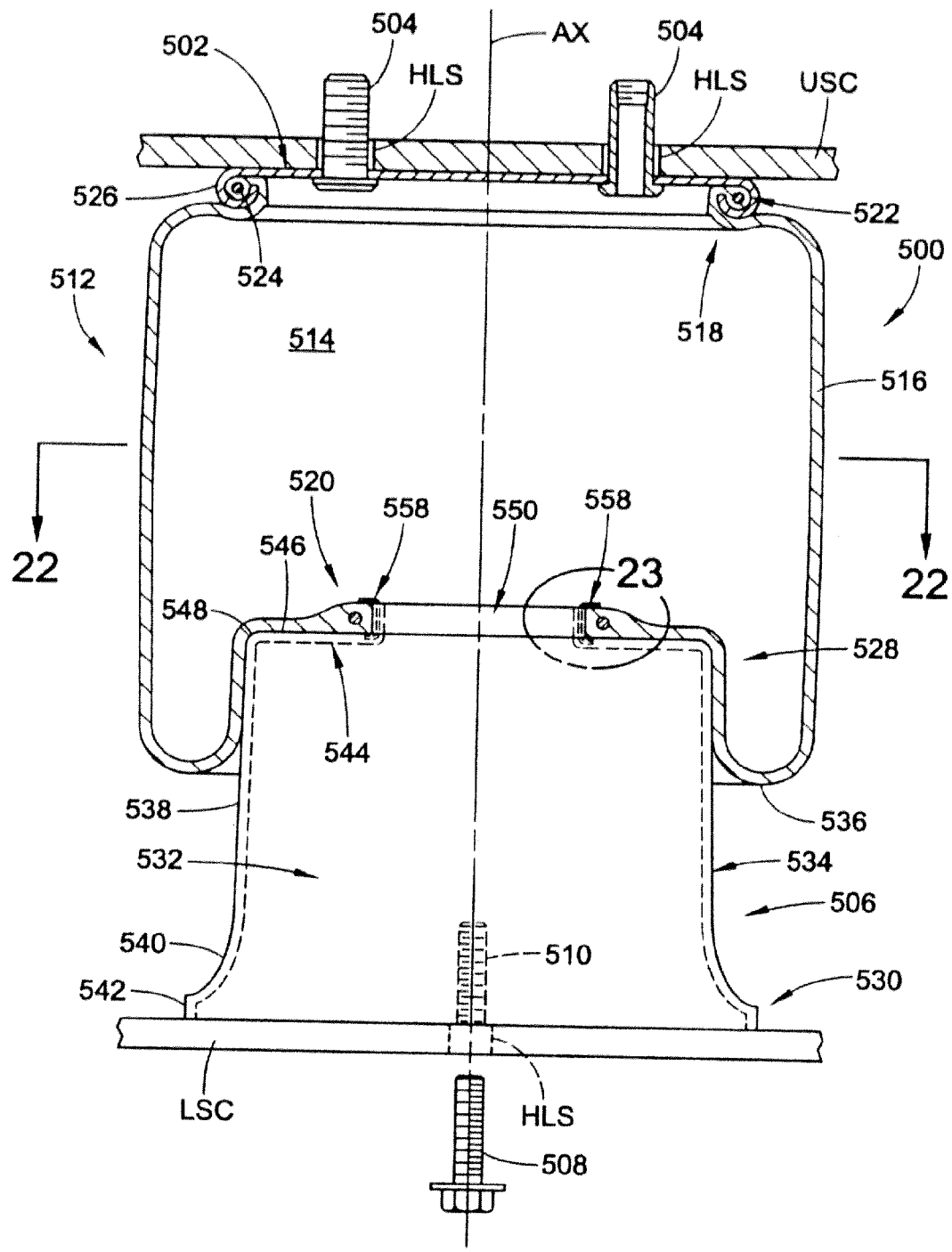
FIG. 21 is a side view, in partial cross section, of one example of a gas spring assembly that includes a piston assembly in accordance with the subject matter of the present disclosure.
Figure 23:
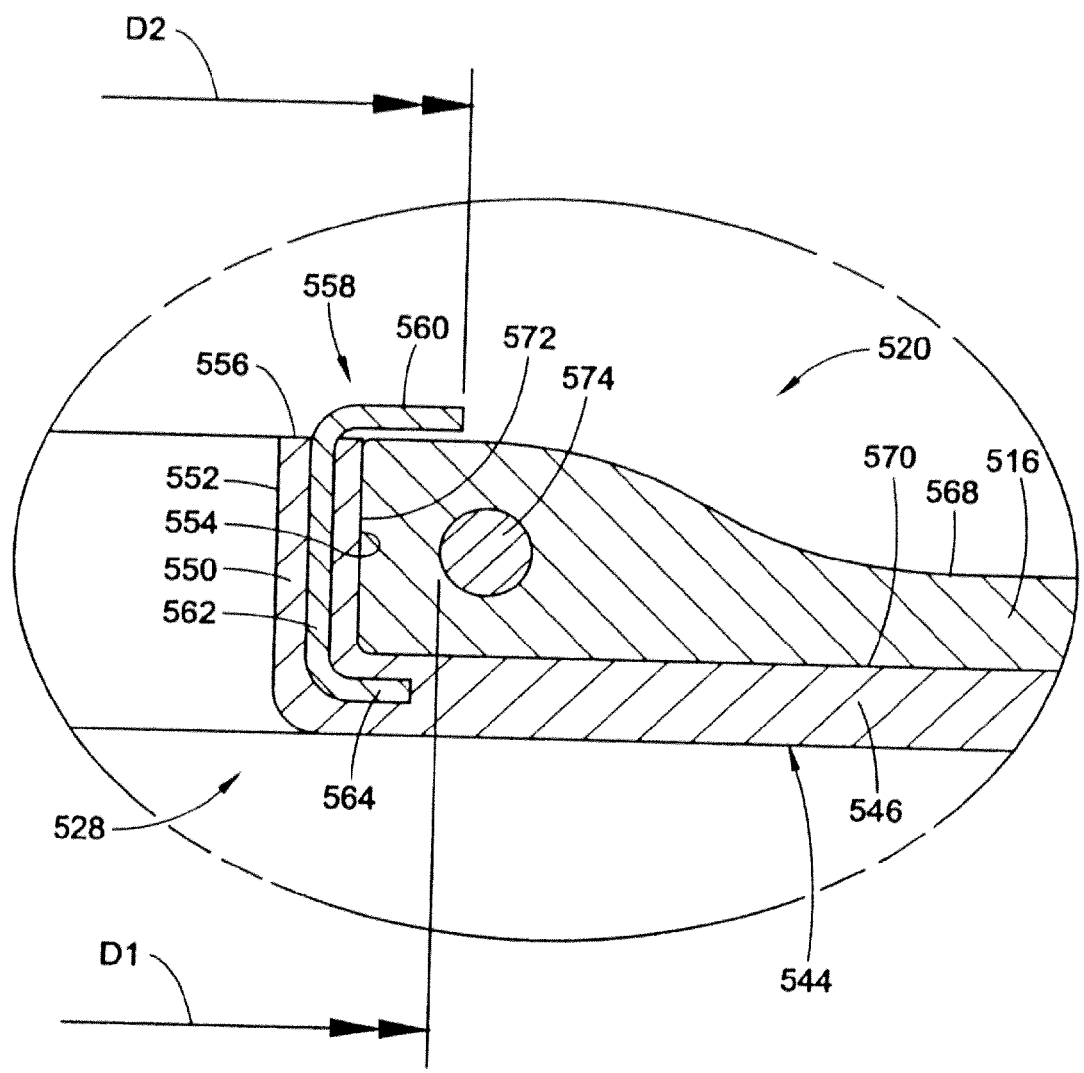
FIG. 23 is an enlarged cross-sectional view of the portion of the flexible wall and piston assembly in FIGS. 21 and 22 identified in Detail 23 of FIG. 21.
Figure 25:
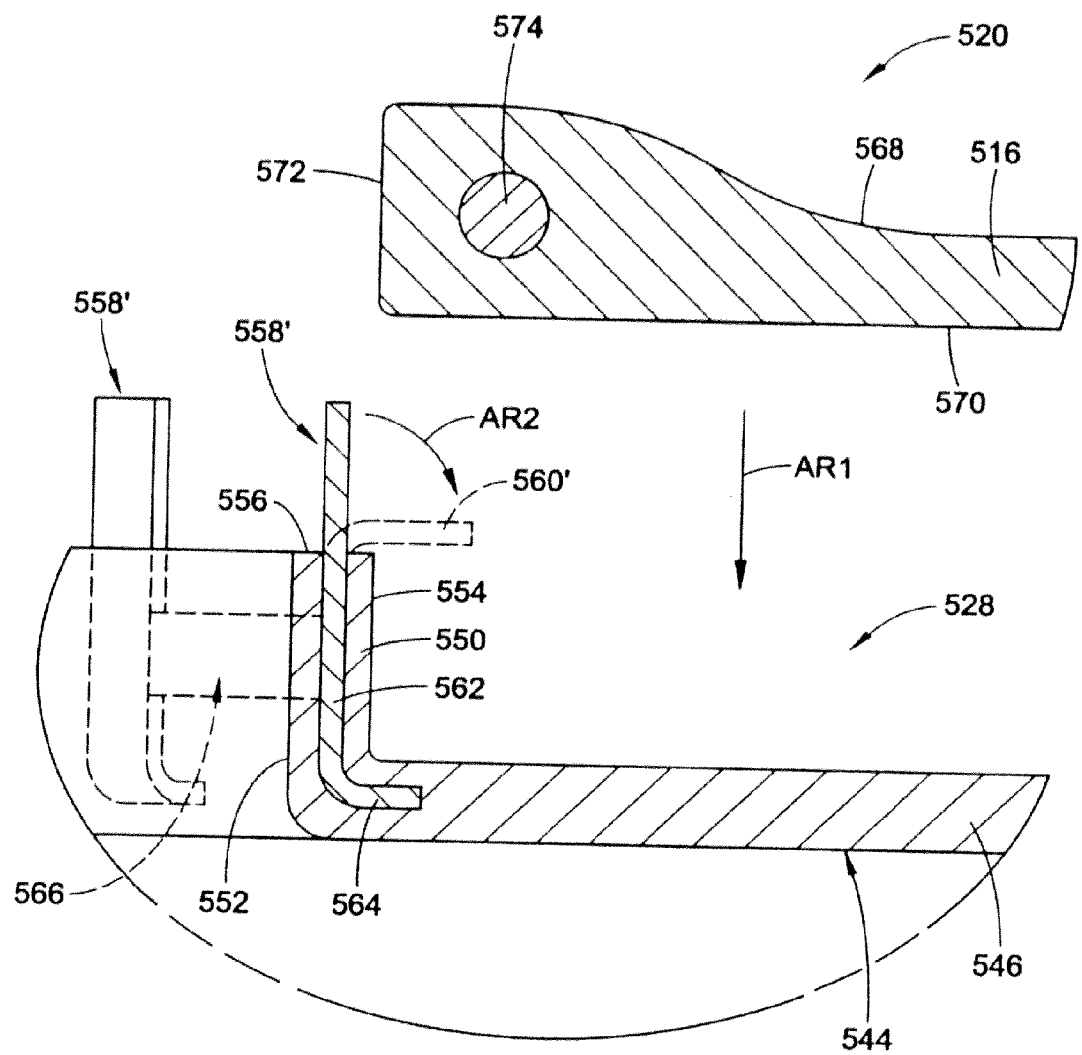
FIG. 25 is an exploded cross-sectional view of the portion of the flexible wall and piston assembly in FIG. 23 prior to assembly.

Piston body 532 also includes a first or upper end wall 544 that extends circumferentially around axis AX and in an orientation that is generally transverse to axis AX and/or a portion of first side wall 534. Additionally, first end wall 544 is shown in FIGS. 21, 23 and 25 as including an approximately planar portion 546 that transitions into first side wall 534 at a curved or shoulder portion 548. It will be understood, however, that first end wall 544 can take any suitable shape, form and/or configuration. For example, shoulder portion 548 could have a larger or smaller radius and/or portion 546 could be at least partially curved or otherwise contoured. Furthermore, the description of first end wall 544 as extending generally transverse to first side wall 534 is to be broadly interpreted. As one example, first end wall 544 could be approximately perpendicular to first side wall 534, such as is shown in FIGS. 21, 23 and 25, for example. Recognizing, however, that the first side wall and first end wall can take a wide variety of shapes, contours, forms and/or configurations, the term "transverse" should be interpreted as including a wide range of relative angular orientations, such as a range of plus (+) or minus (−) 45 degrees from horizontal or the referenced feature or component, for example.

As shown in FIGS. 21, 23 and 25, piston body 532 further includes a second or inner side wall 550 that extends circumferentially around axis AX and in an orientation that is generally transverse, as previously defined, to first end wall 544 and/or in an orientation that is approximately aligned with axis AX. Second side wall 550 can take any suitable shape, form and/or configuration. For example, the second side wall can include approximately cylindrical inner and outer surfaces 552 and 554. Alternately, the second side wall can have one or more surfaces that are frustoconical, curvilinear and/or otherwise contoured. Additionally, second side wall 550 projects from first end wall 544 in a direction generally opposite second end 530 of piston body 532 and terminates at a second end wall 556, which is shown as being approximately planar. However, it will be recognized that any alternate shape, form and/or configuration could be used.

Piston assembly 506 also includes a plurality of retaining elements 558 that are partially embedded within piston body 532 and project axially-outwardly from the piston body in a direction generally away from second end 530. In one exemplary case, the retaining elements can be disposed in circumferentially-spaced relation to one another around axis AX, such as in the arrangement shown in FIGS. 22 and 24, for example.

Figure 22:
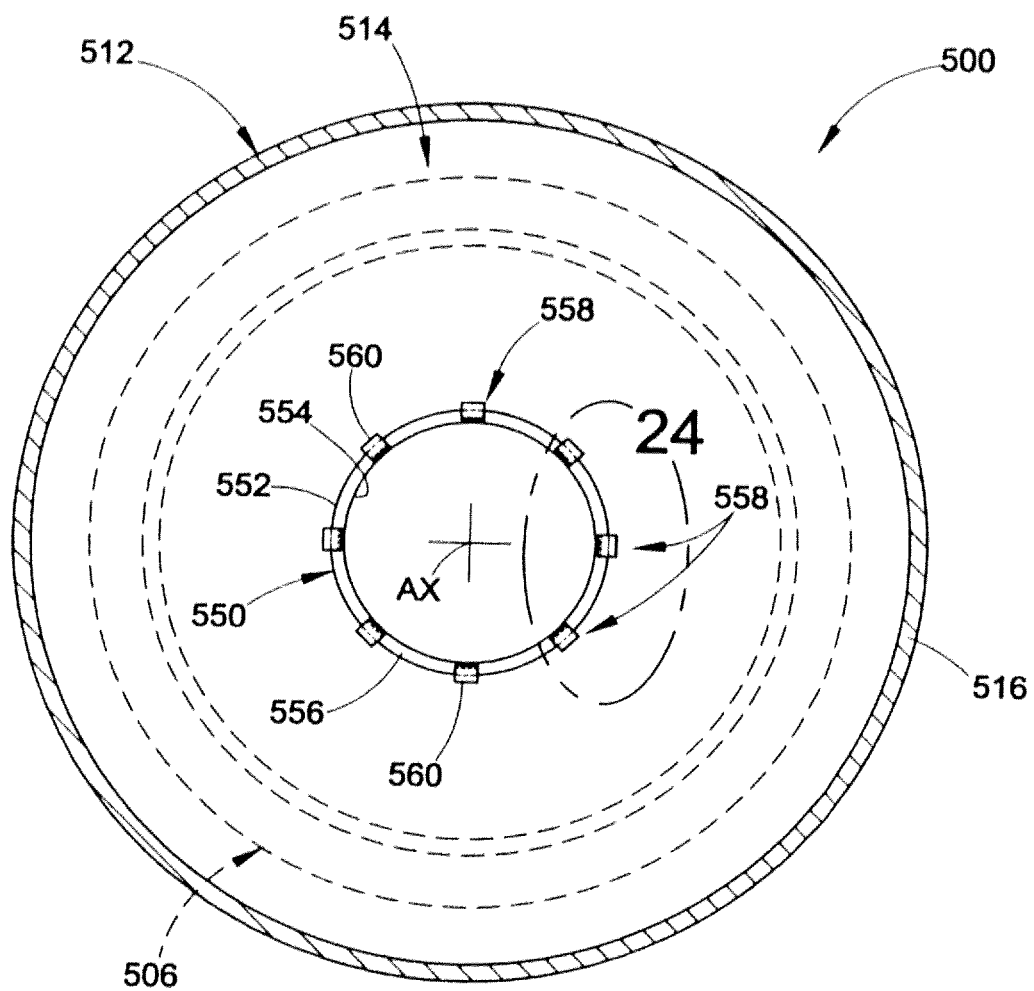
FIG. 22 is a cross-sectional top view of the gas spring assembly in FIG. 21.
Figure 24:
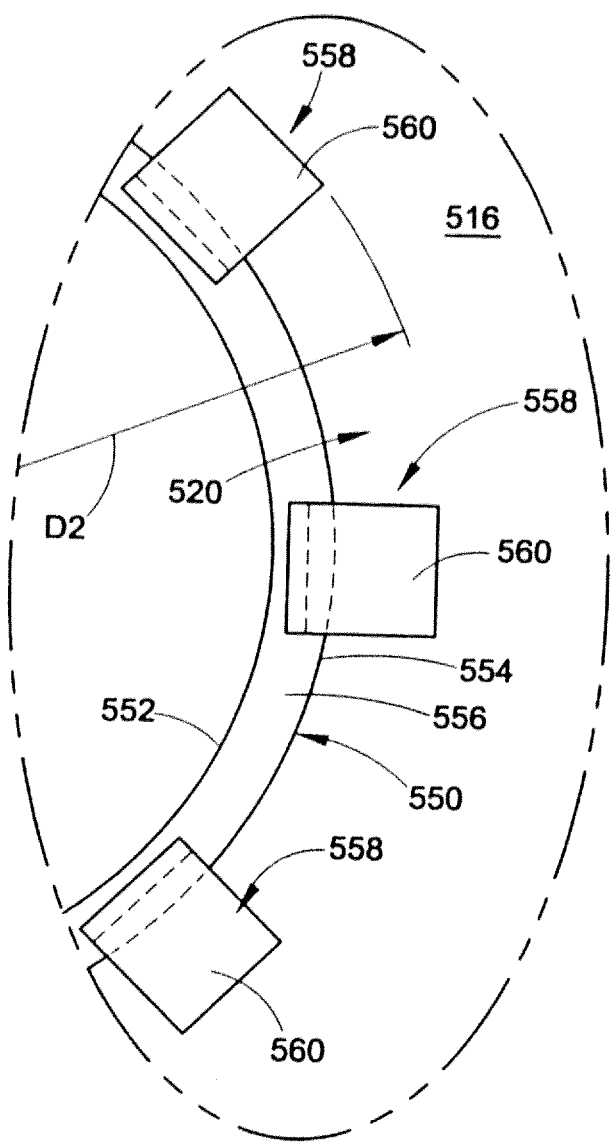
FIG. 24 is a top view of the portion of the flexible wall and piston assembly in FIGS. 21-23 identified in Detail 24 of FIG. 22.

Additionally, any suitable number of retaining elements can be used, such as a number within a range of from two to fifty retaining elements, for example. It will be appreciated that retaining elements 558 can be evenly spaced with respect to one another, such as is shown in FIGS. 22 and 24, for example. Alternately, the retaining elements could be spaced in a graduated or otherwise uneven pattern (not shown), such as may be useful in generating an increased level of retention along one circumferential portion of the piston body relative to another circumferential portion of the piston body. It will be appreciated that the number of retaining elements that may be used can related to any one or more of a variety of factors and considerations, such as, for example, the size, shape and material properties of the piston body and the retaining elements as well as the desired level of retention that is to be achieved. Examples of materials that may be suitable for use as retaining elements include metals, such as aluminum and steel, for example. Examples of materials that may be suitable for use in forming the piston body can include fiber-reinforced thermoplastics, such as glass (or other) fiber-reinforced polypropylene and glass (or other) fiber-reinforced polyamide, for example, and high-strength (unfilled) thermoplastics, such as polyester, polyethylene and other polyether-based materials or any combination thereof, for example.

In the exemplary arrangement shown and described herein, retaining elements 558 extend generally longitudinally between a free end 560 that is disposed out of piston body 532 and an embedded end 562 that is encapsulated within the piston body. In one example of such an arrangement, the retaining elements are partially embedded in at least second side wall 550. Optionally, a portion 564 of the embedded end of retaining elements 558 can extend into or otherwise along a portion of first end wall 544, such as is shown in FIGS. 21, 23 and 25, for example. Additionally, the plurality of retaining elements can be separate elements that are each independently embedded within the piston body. Alternately, however, the plurality of retaining elements could be connected together in a suitable manner, such as by one or more connecting walls, as is represented in FIG. 25 by item number 566, for example.

It will be recognized that retaining elements 558 function to retain second open end 520 of flexible wall 516 in abutting engagement on or along the second end member (e.g., piston 506) such that a substantially fluid-tight seal is maintained therebetween. In one exemplary arrangement, free end 560 of the retaining elements extends approximately axially from second end wall 556 of second side wall 550 and is formed or otherwise deflected to extend approximately transverse, such as has been defined above, with respect to the second side wall. In this manner, the free ends project radially-outwardly beyond the second side wall 550 and along at least a portion of flexible wall 516. It will be appreciated that in some cases the free end of the retaining elements may contact or otherwise abuttingly engage the flexible wall or second open end thereof. In other cases, however, the free end may be disposed in axially spaced relation to the flexible wall or second open end thereof, such as is shown in FIG. 23, for example.

Flexible wall 516 includes an inside surface 568 that is in fluid communication with spring chamber 514 and an outside surface 570 that abuttingly engages first side wall 534 and first end wall 544 of piston body 532. As can be better seen in FIGS. 23 and 25, flexible wall 516 also includes an end surface 572 extending between and connecting the inside and outside surfaces along second open end 520. An annular reinforcement member 574, such as a bead wire, for example, can optionally be embedded within the flexible wall along second open end 520. In a preferred arrangement, reinforcement member 574 has an approximate inside dimension D1 (FIG. 23) and retaining elements 558 extend radially-outwardly in the formed or deflected condition to an approximate outside dimension D2 (FIGS. 23 and 24). In such an arrangement, retaining elements 558 can at least partially overlap reinforcement member 574 and benefit from any additional rigidity provided to second open end 520 by the reinforcement member. It will be appreciated, however, that other arrangements could alternately be used, such as, for example, an arrangement in which the outside dimension of the retaining elements is less than inside dimension D1 of the reinforcement member but greater than an outside dimension (not shown) of second side wall 550.

One method of assembling a gas spring assembly, such as gas spring assembly 500, for example, can include providing a flexible sleeve (e.g., flexible sleeve 512) having opposing open ends (e.g., first and second open ends 518 and 520). The method can also include providing a first end member (e.g., bead plate 502) and securing the same across the first open end of the flexible sleeve such that a substantially fluid-tight seal is formed therebetween. The method can also include providing a second end member, such as piston assembly 506, for example, having an end member body (e.g., piston body 532) and a plurality of retaining elements (e.g., retaining elements 558) that are each partially embedded therein. Initially, the remaining portion (e.g., free ends 560) of the retaining elements projects approximately axially-outwardly from the end member body, such as is represented by retaining elements 558' in FIG. 25, for example. In this manner, an open end of the flexible sleeve (e.g., second open end 520) can then be positioned adjacent the second end member and pressed onto or otherwise urged into abutting engagement with one or more walls of the second end member, as is represented by arrow AR1 in FIG. 25, such that a substantially fluid-tight seal is formed therebetween. The remaining portions (e.g., free ends 560) of the retaining elements can then be bent, deflected or otherwise formed into a radially-outwardly extending orientation, such as is represented arrow AR2 and dashed line 560' in FIG. 25, for example. In this manner, the retaining elements can assist in retaining the second open end of the flexible sleeve on the second end member.

FIGS. 26-29 illustrate still a further example of a gas spring assembly 600 in accordance with the subject matter of the present disclosure that is disposed between opposing structural components, such as upper and lower structural components USC and LSC of an associated vehicle (not shown), for example. Gas spring assembly 600 is shown as having a longitudinal axis AX and including a first end member, such as a top or bead plate 602, for example, that is adapted for securement on or along one of the structural components (e.g., upper structural component USC). It will be appreciated that the first end member can be secured along the structural component in any suitable manner, such as, for example, by using one or more threaded mounting studs 604 that extend through corresponding mounting holes HLS in one of the associated structural components (e.g., upper structural component USC).

Gas spring 600 also includes an opposing second end member, such as a piston 606, for example, that is longitudinally spaced from the first end member and that is adapted for securement on or along a different one of the structural components, such as lower structural component LSC, for example. Again, it will be appreciated that the second end member can be operatively connected to or otherwise secured on or along the structural component in any suitable manner, such as by using one or more threaded fasteners 608 to extend through mounting holes HLS in the associated structural component (e.g., lower structural component LSC) and threadably engage a corresponding mounting feature in the second end member, such as a threaded passage 610, for example.

Gas spring 600 also includes a flexible sleeve or bellows 612 that is operatively connected between the first and second end members and at least partially defines a spring chamber 614 therebetween. In the exemplary arrangement shown in FIG. 26, flexible sleeve 612 includes a flexible wall 616 that extends between opposing first and second open ends 618 and 620. Flexible wall 616 includes an inside surface 622 that is in fluid communication with spring chamber 614 and an outside surface 624 that abuttingly engages piston 606. As can be better seen in FIG. 28, flexible wall 616 also includes an end surface 626 that extends between and connects the inside and outside surfaces along second open end 620. It will be appreciated that flexible wall 616 can be formed in any suitable manner, such as by using one or more fabric-reinforced, elastomeric plies or layers (not shown) and/or one or more un-reinforced, elastomeric plies or layers (not shown), for example. Optionally, an annular reinforcement member 628, such as a bead wire, for example, can be embedded within the flexible wall along second open end 620.

First open end 618 can be secured on or along first end member 602 in any manner suitable for forming a substantially fluid-tight seal therewith. For example, flexible sleeve 612 can include a mounting bead 630 formed along first open end 618 that can, optionally, include an annular reinforcement member 632, such as a bead wire, for example, embedded therein with first end member 602 secured along or across the first open end of the flexible sleeve by capturing at least a portion of the mounting bead using a crimped edge connection 634.

Piston 606 extends longitudinally between a first or upper end 636 and a second or lower end 638. First end 636 is adapted to receive and form a substantially fluid-tight seal with second open end 620 of flexible sleeve 612. Second end 638 of piston 606 is adapted to abuttingly engage an associated structural component, such as lower structural component LSC, for example. Additionally, as discussed above, piston 606 can be secured on or along the associated structural component in any suitable manner, such as by using threaded fastener 608 and threaded passage 610, for example.

Piston 606 includes a piston body 640 and can also, optionally, include one or more additional components and/or elements, such as one or more threaded inserts, for example. The piston body has a first or outer side wall 642 that extends generally longitudinally between first and second ends 636 and 638. In use, flexible wall 616 of flexible sleeve 612 forms a rolling-lobe 644 that is displaced along first side wall 642 as the gas spring undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of the piston assembly. As such, it will be appreciated that the profile of first side wall 642 is merely exemplary in that the same includes a first portion 646 having an approximately frustoconical or tapered shape, a second wall portion 648 having a curvilinear shape, and a third portion 650 having an approximately cylindrical shape.

Figure 26:
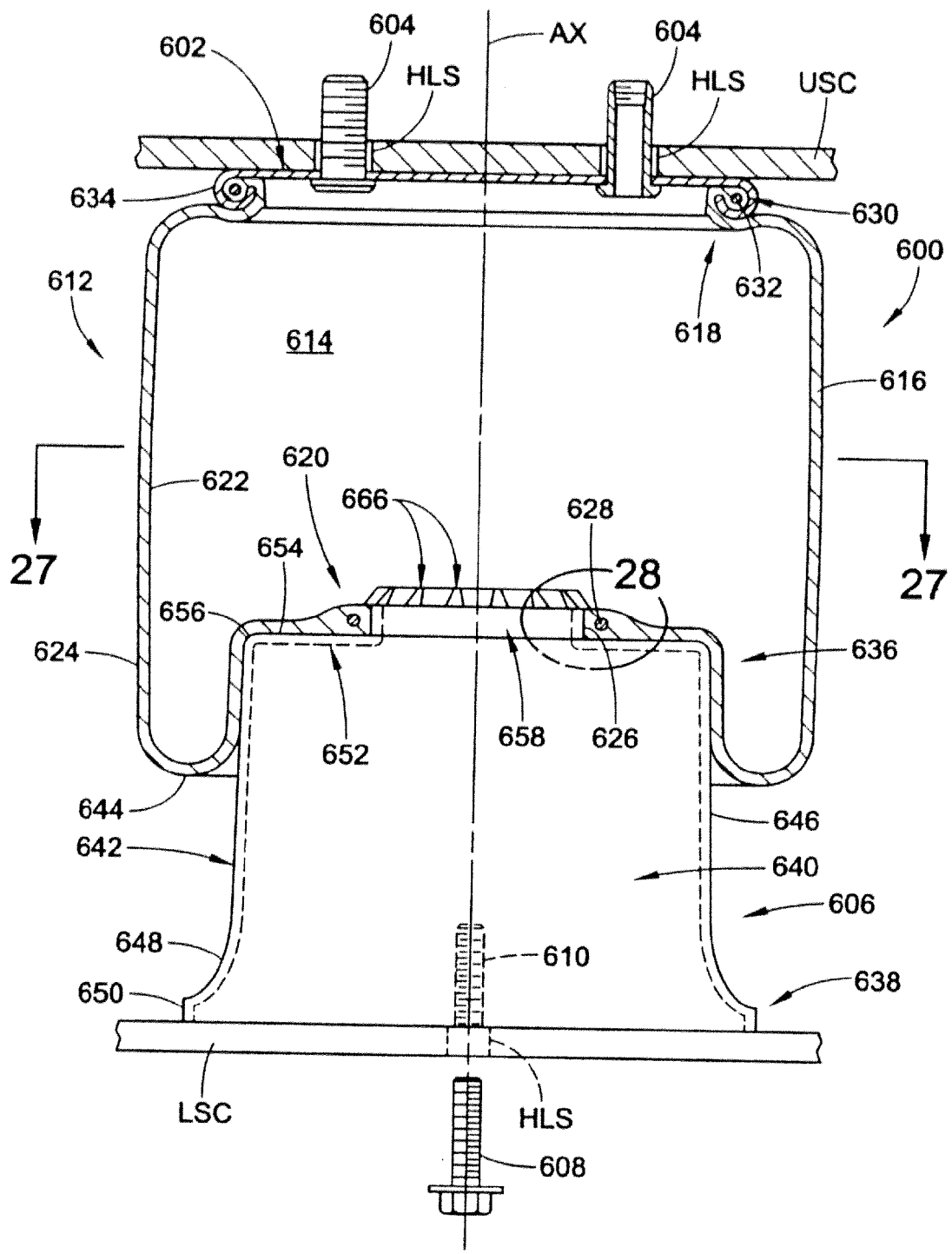
FIG. 26 is a side view, in partial cross section, of another example of a gas spring assembly that includes a piston in accordance with the subject matter of the present disclosure.
Figure 27:
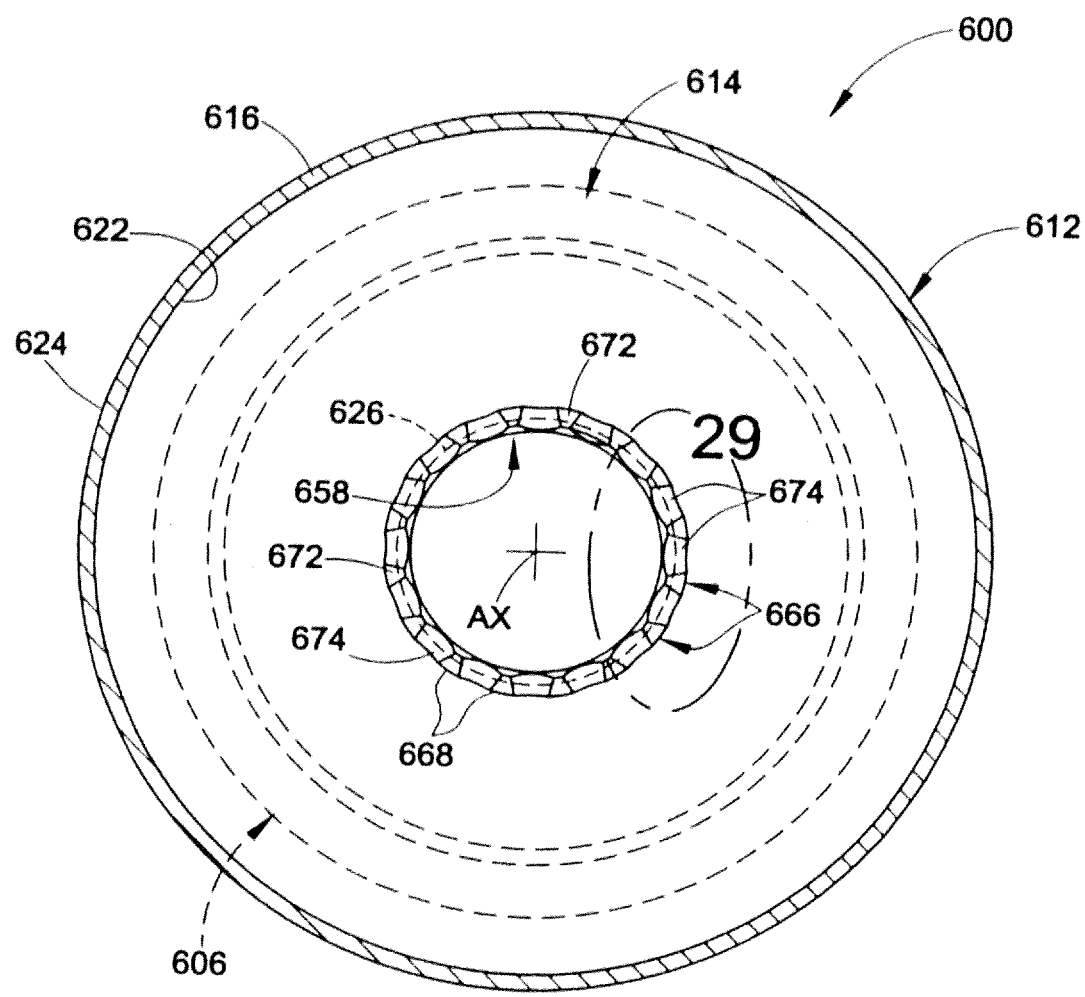
FIG. 27 is a cross-sectional top view of the gas spring assembly in FIG. 26.
Figure 28:
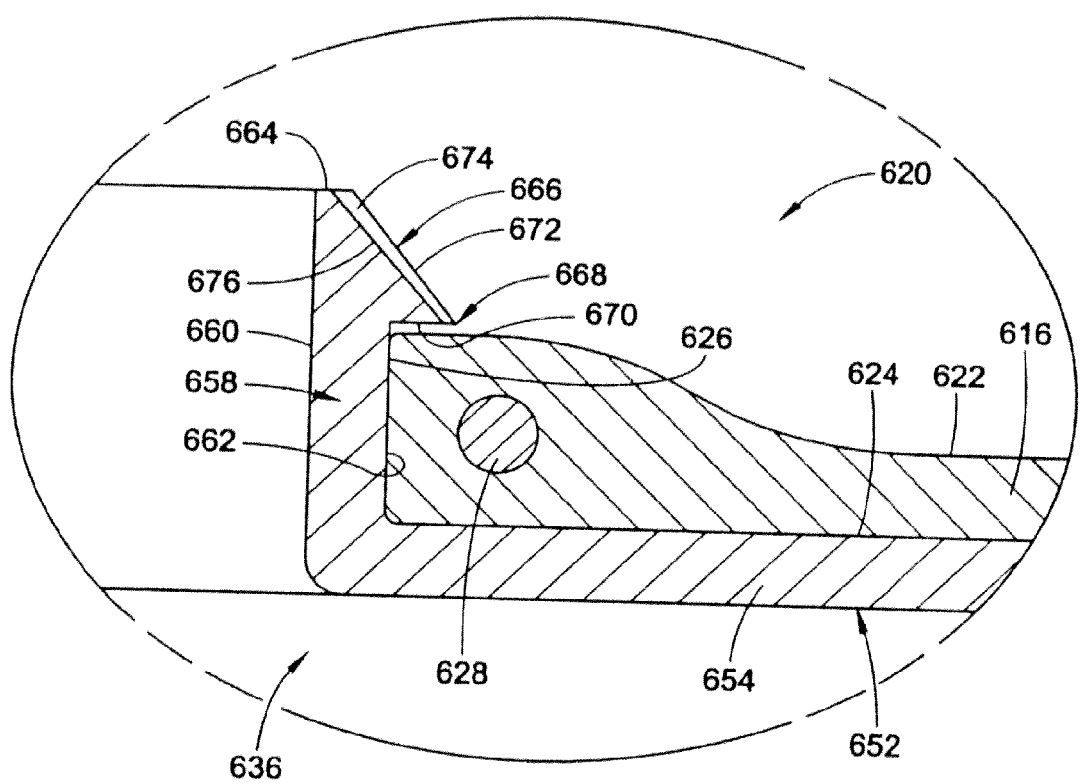
FIG. 28 is an enlarged cross-sectional view of the portion of the flexible wall and piston in FIGS. 26 and 27 identified in Detail 28 of FIG. 26.
Figure 29:
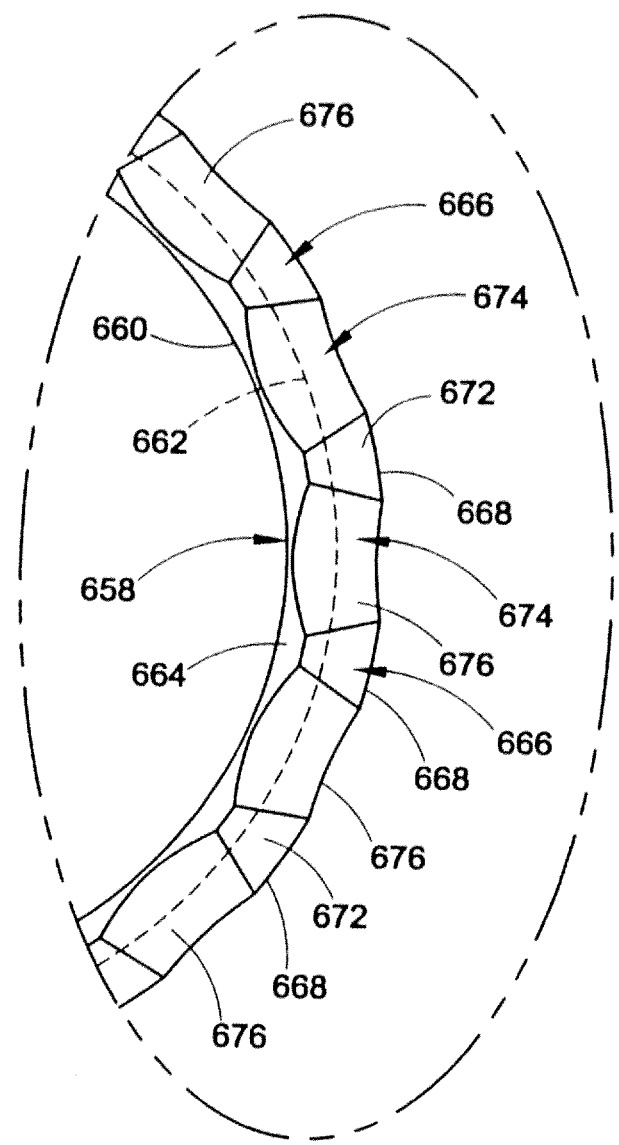
FIG. 29 is a top view, in partial cross section, of the portion of the flexible wall and piston in FIGS. 26-28 identified in Detail 29 of FIG. 27.

Piston body 640 also includes a first or upper end wall 652 that extends circumferentially around axis AX and in an orientation that is generally transverse to axis AX and/or a portion of first side wall 642. Additionally, first end wall 652 is shown in FIGS. 26 and 28 as including an approximately planar portion 654 that transitions into first side wall 642 at a curved or shoulder portion 656. It will be understood, however, that first end wall 652 can take any suitable shape, form and/or configuration. For example, shoulder portion 656 could have a larger or smaller radius and/or portion 654 could be at least partially curved or otherwise contoured. Furthermore, the description of first end wall 652 as extending generally transverse to first side wall 642 is to be broadly interpreted. As one example, first end wall 652 could be approximately perpendicular to first side wall 642, such as is shown in FIGS. 26 and 28, for example. Recognizing, however, that the first side wall and first end wall can take a wide variety of shapes, contours, forms and/or configurations, the term "transverse" should be interpreted as including a wide range of relative angular orientations, such as a range of plus (+) or minus (−) 45 degrees from horizontal or the referenced feature or component, for example.

As shown in FIGS. 26-29, piston body 640 further includes a second or inner side wall 658 that extends circumferentially around axis AX and in an orientation that is generally transverse, as previously defined, to first end wall 652 and/or in an orientation that is approximately aligned with axis AX. Second side wall 658 can take any suitable shape, form and/or configuration. For example, the second side wall can include approximately cylindrical inner and outer surfaces 660 and 662, and can have a longitudinal length dimension and extend in circumferentially continuously and substantially uniformly around axis AX at approximately the same longitudinal length dimension. Alternately, the second side wall can have one or more surfaces that are frustoconical, curvilinear and/or otherwise contoured, and/or can include one or more wall passages or openings extending through the second side wall. Additionally, second side wall 658 projects from first end wall 652 in a direction generally opposite second end 636 of piston body 640 and terminates at a second end wall 664, which is shown as being approximately planar. However, it will be recognized that any alternate shape, form and/or configuration could be used.

Piston body 640 also includes a plurality of retainment ridge segments 666 that extend circumferentially around axis AX and project radially-outwardly from second side wall 658. In the exemplary embodiment shown in FIGS. 26-29, retainment ridge segments 666 include an outermost edge 668 and a shoulder surface 670 that extends circumferentially around axis AX and radially outwardly from outer surface 662 of second side wall 658 to outermost edge 668. Additionally, shoulder surface 670 is disposed in facing relation to first end wall 652 and extends radially outwardly in generally transverse relation, as previously defined, to second side wall 658.

Retainment ridge segments 666 include an outer surface 672 that extends generally circumferentially around axis AX and is oriented in a direction facing radially-outwardly and generally away from first end wall 652. In the exemplary arrangement shown in FIGS. 26-29, a relief feature or segment 674 is formed or otherwise provided between adjacent ones of retainment ridge segments 666. As such, a plurality of relief features 674 are disposed in circumferentially spaced relation to one another around axis AX with the retainment ridge segments and relief features being interleaved with one another (i.e., alternating from one to the other) around and/or along piston body 640.

One benefit of utilizing a plurality of retainment ridge segments of the above-described construction is that a discontinuous outer surface is formed thereby that should result in reduced surface contact with the associated flexible wall that is retained by the retainment ridge segments. Such reduced contact is expected to result in reduced frictional forces generated by the displacement of second open end 620 of flexible sleeve 612 over the retainment ridge segments. The anticipated reduction of frictional forces is expected to permit the second open end to be urged or otherwise snapped-over a retainment ridge structure formed by the plurality of retainment ridge segments that has a greater cross-sectional dimension (e.g., diameter) than may be practical with conventional retainment ridge constructions. Such an increase in cross-sectional dimension can result in an enlarged shoulder surface and/or other features that would be expected to provide increased retention of the flexible wall on the piston, such as may be useful under tension load conditions, for example.

It will be appreciated that relief features 674 can be of any size, shape, quantity, arrangement and/or configuration that may be suitable for providing one or more of the benefits discussed above or others. As such, the relief features can include a relief surface 676 (FIGS. 28 and 29) that forms an inward extent of the relief feature. Additionally, relief surface 676 can extend into or otherwise intersect with any one or more of inner surface 662 and/or outer surface 664 of second side wall 658, second end wall 664, shoulder surface 670 and/or outer surface 672. In the exemplary arrangement shown, the relief surface intersects second end wall 664, shoulder surface 670 and outer surface 672. As such, relief surfaces 676 are spaced outwardly of inner and outer surfaces 662 and 664, which remain substantially continuous and uniform. It will be appreciated, however, that any other size, shape, quantity, arrangement and/or configuration of relief surfaces could alternately be used. For example, retainment ridge segments 666 as well as relief features 674 and relief surfaces 676 are shown as being, respectively, substantially identical to one another. However, different ones of the retainment ridge segments, relief features and/or relief surfaces could differ from occurrence to occurrence along or around the piston body 640.

Figure 30:
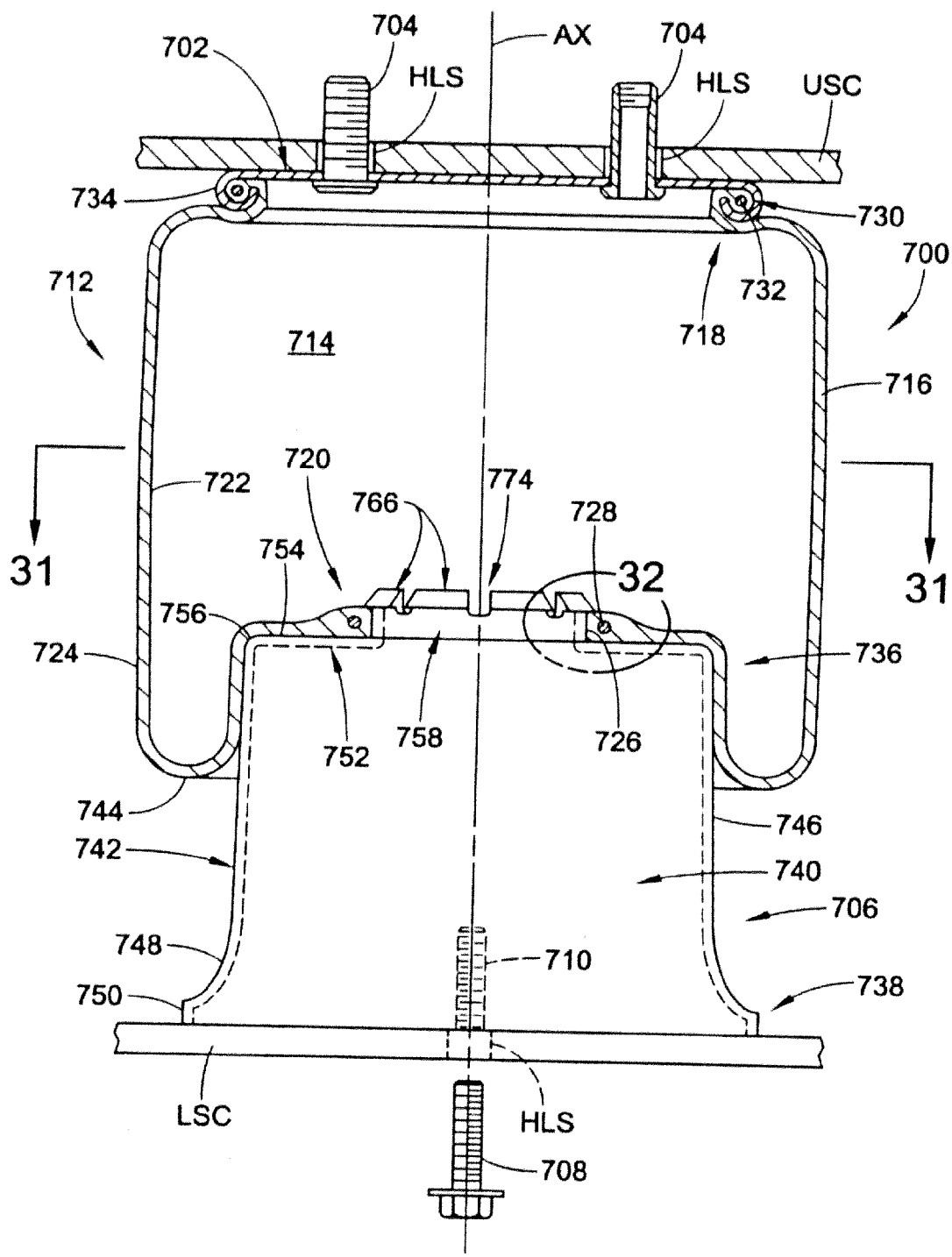
FIG. 30 is a side view, in partial cross section, of a further example of a gas spring assembly that includes a piston in accordance with the subject matter of the present disclosure.
Figure 31:
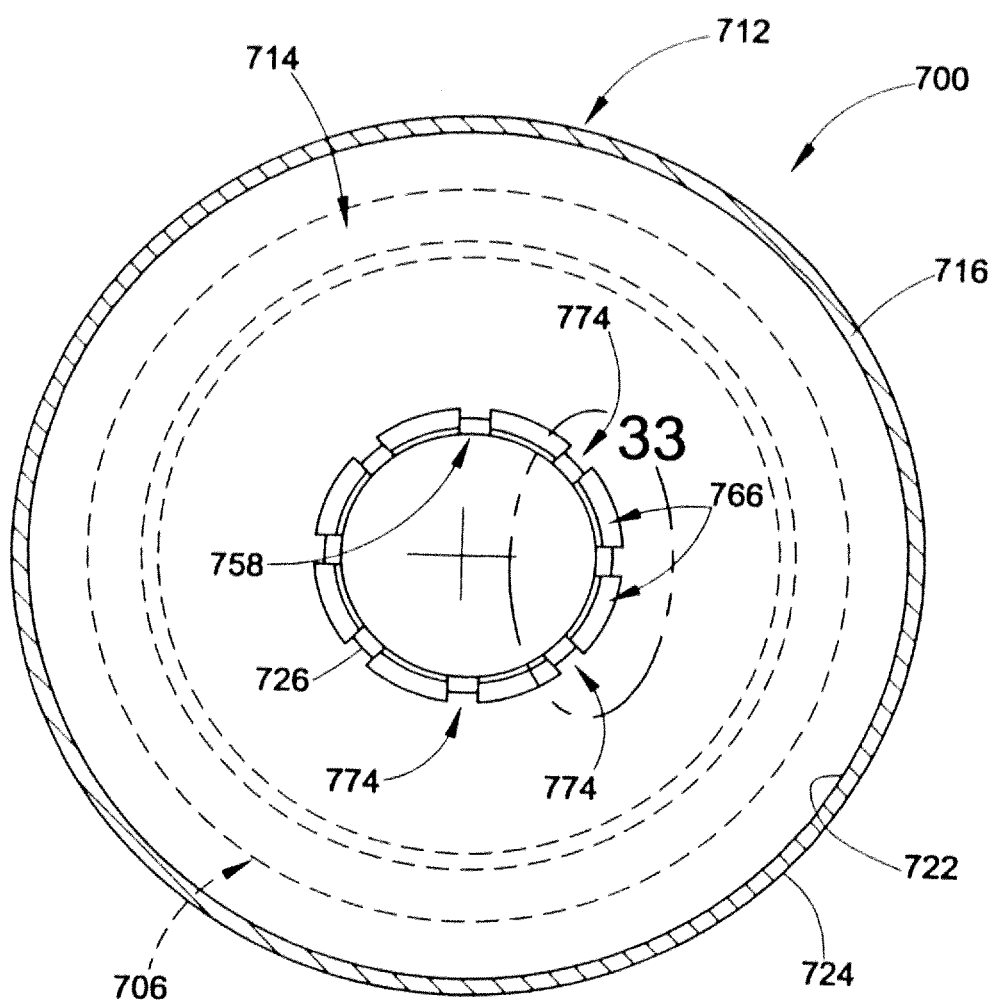
FIG. 31 is a cross-sectional top view of the gas spring assembly in FIG. 30.

FIG. 30 illustrates yet another example of a gas spring assembly 700 in accordance with the subject matter of the present disclosure that is disposed between opposing structural components, such as upper and lower structural components USC and LSC of an associated vehicle (not shown), for example. Gas spring assembly 700 is shown as having a longitudinal axis AX and including a first end member, such as a top or bead plate 702, for example, that is adapted for securement on or along one of the structural components (e.g., upper structural component USC). It will be appreciated that the first end member can be secured along the structural component in any suitable manner, such as, for example, by using one or more threaded mounting studs 704 that extend through corresponding mounting holes HLS in one of the associated structural components (e.g., upper structural component USC).

Gas spring 700 also includes an opposing second end member, such as a piston 706, for example, that is longitudinally spaced from the first end member and that is adapted for securement on or along a different one of the structural components, such as lower structural component LSC, for example. Again, it will be appreciated that the second end member can be operatively connected to or otherwise secured on or along the structural component in any suitable manner, such as by using one or more threaded fasteners 708 to extend through mounting holes HLS in the associated structural component (e.g., lower structural component LSC) and threadably engage a corresponding mounting feature in the second end member, such as a threaded passage 710, for example.

Gas spring 700 also includes a flexible sleeve or bellows 712 that is operatively connected between the first and second end members and at least partially defines a spring chamber 714 therebetween. In the exemplary arrangement shown in FIG. 30, flexible sleeve 712 includes a flexible wall 716 that extends between opposing first and second open ends 718 and 720. Flexible wall 716 includes an inside surface 722 that is in fluid communication with spring chamber 714 and an outside surface 724 that abuttingly engages piston 706. As can be better seen in FIG. 32, flexible wall 116 also includes an end surface 726 that extends between and connects the inside and outside surfaces along second open end 720. It will be appreciated that flexible wall 716 can be formed in any suitable manner, such as by using one or more fabric-reinforced, elastomeric plies or layers (not shown) and/or one or more un-reinforced, elastomeric plies or layers (not shown), for example. Optionally, an annular reinforcement member 728, such as a bead wire, for example, can be embedded within the flexible wall along second open end 720.

First open end 718 can be secured on or along first end member 702 in any manner suitable for forming a substantially fluid-tight seal therewith. For example, flexible sleeve 712 can include a mounting bead 730 formed along first open end 718 that can, optionally, include an annular reinforcement member 732, such as a bead wire, for example, embedded therein with first end member 702 secured along or across the first open end of the flexible sleeve by capturing at least a portion of the mounting bead using a crimped edge connection 734.

Piston 706 extends longitudinally between a first or upper end 736 and a second or lower end 738. First end 736 is adapted to receive and form a substantially fluid-tight seal with second open end 720 of flexible sleeve 712. Second end 738 of piston 706 is adapted to abuttingly engage an associated structural component, such as lower structural component LSC, for example. Additionally, as discussed above, piston 706 can be secured on or along the associated structural component in any suitable manner, such as by using threaded fastener 708 and threaded passage 710, for example.

Piston 706 includes a piston body 740 and can also, optionally, include one or more additional components and/or elements, such as one or more threaded inserts, for example. The piston body has a first or outer side wall 742 that extends generally longitudinally between first and second ends 736 and 738. In use, flexible wall 716 of flexible sleeve 712 forms a rolling-lobe 744 that is displaced along first side wall 742 as the gas spring undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of the piston assembly. As such, it will be appreciated that the profile of first side wall 742 is merely exemplary in that the same includes a first portion 746 having an approximately frustoconical or tapered shape, a second wall portion 748 having a curvilinear shape, and a third portion 750 having an approximately cylindrical shape.

Figure 32:
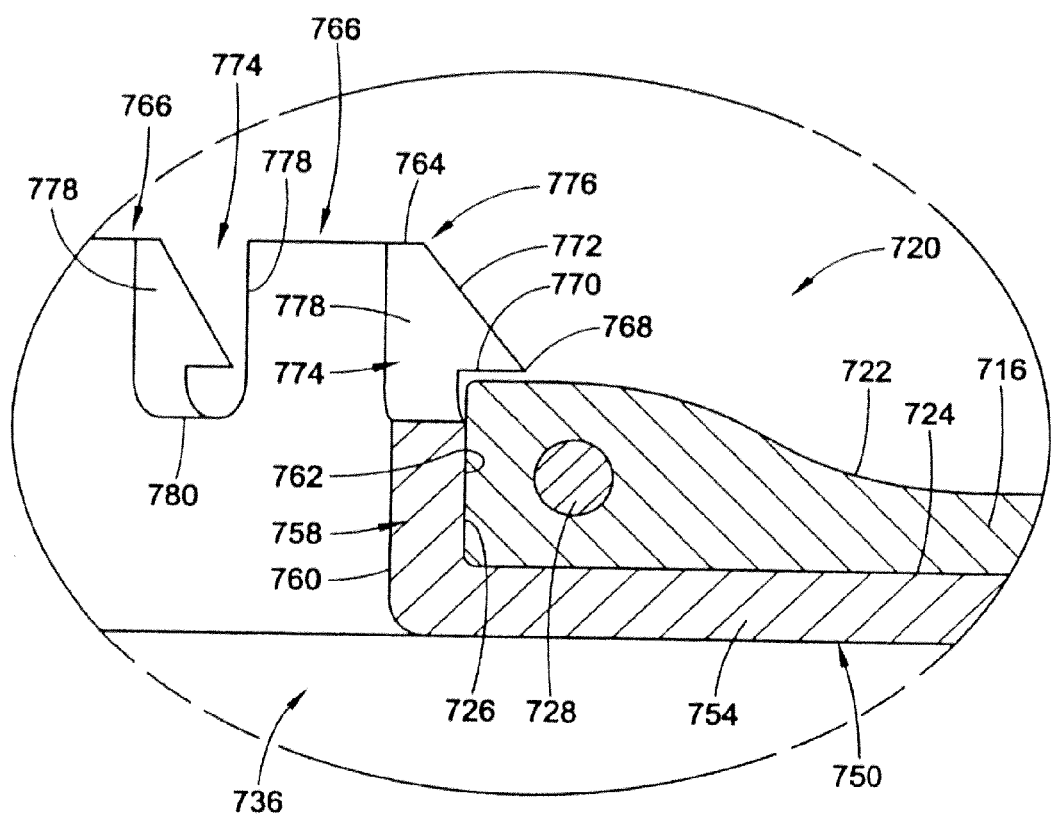
FIG. 32 is an enlarged cross-sectional view of the portion of the flexible wall and piston in FIGS. 30 and 31 identified in Detail 32 of FIG. 30.
Figure 33:
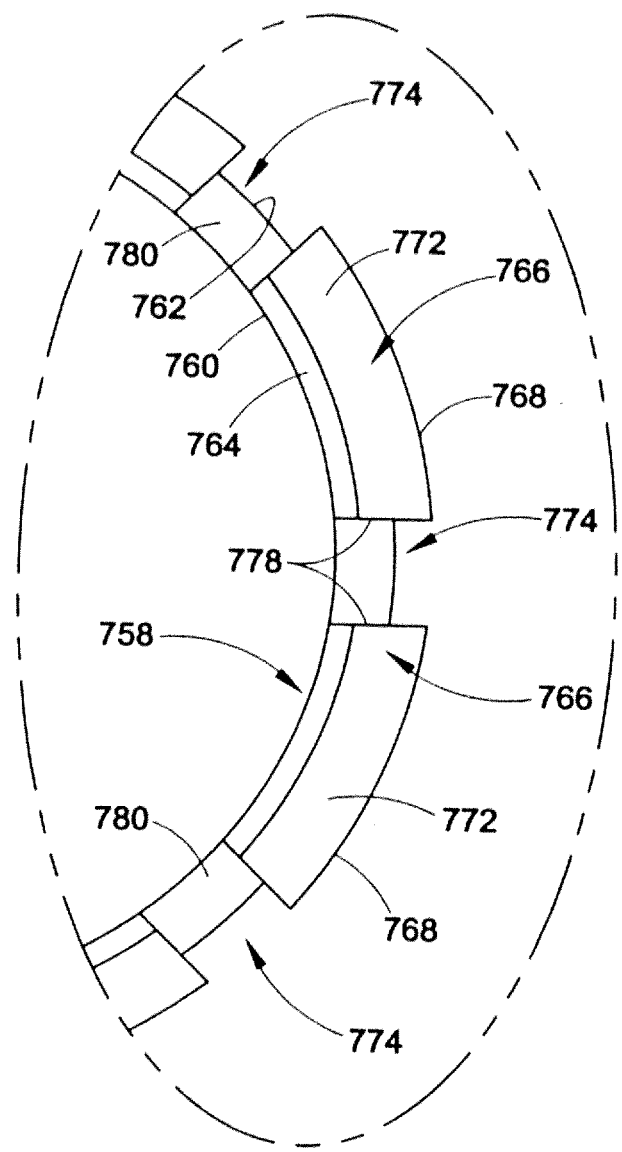
FIG. 33 is a top view, in partial cross section, of the portion of the flexible wall and piston in FIGS. 30-32 identified in Detail 33 of FIG. 31.

Piston body 740 also includes a first or upper end wall 752 that extends circumferentially around axis AX and in an orientation that is generally transverse to axis AX and/or a portion of first side wall 742. Additionally, first end wall 752 is shown in FIGS. 30 and 32 as including an approximately planar portion 754 that transitions into first side wall 742 at a curved or shoulder portion 756. It will be understood, however, that first end wall 752 can take any suitable shape, form and/or configuration. For example, shoulder portion 756 could have a larger or smaller radius and/or portion 754 could be at least partially curved or otherwise contoured. Furthermore, the description of first end wall 752 as extending generally transverse to first side wall 742 is to be broadly interpreted. As one example, first end wall 752 could be approximately perpendicular to first side wall 742, such as is shown in FIGS. 30 and 32, for example. Recognizing, however, that the first side wall and first end wall can take a wide variety of shapes, contours, forms and/or configurations, the term "transverse" should be interpreted as including a wide range of relative angular orientations, such as a range of plus (+) or minus (−) 45 degrees from horizontal or the referenced feature or component, for example.

As shown in FIGS. 30-33, piston body 740 further includes a second or inner side wall 758 that extends circumferentially around axis AX and in an orientation that is generally transverse, as previously defined, to first end wall 752 and/or in an orientation that is approximately aligned with axis AX. Second side wall 758 can take any suitable shape, form and/or configuration. For example, the second side wall can include approximately cylindrical inner and outer surfaces 760 and 762. Alternately, the second side wall can have one or more surfaces that are frustoconical, curvilinear and/or otherwise contoured. Additionally, second side wall 758 projects from first end wall 752 in a direction generally opposite second end 736 of piston body 740 and terminates at a second end wall 764, which is shown as being approximately planar. However, it will be recognized that any alternate shape, form and/or configuration could be used.

Piston body 740 also includes a plurality of retainment ridge segments 766 that are spaced circumferentially-apart from one another around axis AX and project radially-outwardly from second side wall 758. Retainment ridge segments 766 include an outermost edge 768, a shoulder surface 770 and an outer surface 772. Shoulder surfaces 770 extend circumferentially around axis AX and radially outwardly from outer surface 762 of second side wall 758 to outermost edge 768. Additionally, shoulder surfaces 770 are disposed in facing relation to first end wall 752 and extend radially outwardly in generally transverse relation, as previously defined, to second side wall 758.

Retainment ridge segments 766 include an outer surface 772 that extends generally circumferentially around axis AX and is oriented in a direction facing radially-outwardly and generally away from first end wall 752. In the exemplary arrangement shown in FIGS. 30-33, a relief feature or channel 774 is formed or otherwise provided between adjacent ones of retainment ridge segments 766. As such, a plurality of channels 774 are disposed in circumferentially spaced relation to one another around axis AX with the retainment ridge segments and channels being interleaved with one another (i.e., alternating from one to the other) around and/or along piston body 740.

One benefit of utilizing a plurality of retainment ridge segments of the above-described construction is that each retainment ridge segment includes a free end 776 that is capable of radially-inward deflection independent of the retainment ridge segments adjacent thereto. Such radially-inward deflection will act to effectively reduce the outside dimension formed by outermost edges 768 during installation of an associated flexible wall on the piston body. As such, retainment ridge segments having increased radial dimensions and/or radially-outward extents (e.g., enlarged outermost edges 768 and/or shoulder surfaces 770) can be used. It is expected that such an increase the engagement of the features of the retainment ridge segments with flexible wall 716 will result in increased retention of flexible sleeve 712 on piston 706.

It will be appreciated that channels 774 can be of any size, shape, quantity, arrangement and/or configuration that may be suitable for providing one or more of the benefits discussed above, or others. As such, channels 774 can extend into or otherwise intersect with any one or more of inner surface 762 and/or outer surface 764 of second side wall 758, second end wall 764, shoulder surface 770 and/or outer surface 772. In the exemplary arrangement shown, channels 774 extend through or otherwise intersect at least a portion of each of inner surface 762 and/or outer surface 764 of second side wall 758, second end wall 764, shoulder surface 770 and outer surface 772. Additionally, it will be appreciated that channels 774 can be of any suitable size, shape, quantity, arrangement and/or configuration. In the exemplary arrangement shown in FIGS. 30-33, channels 774 are shown as being approximately U-shaped and include opposing side walls 778 and a bottom wall 780. However, it will be appreciated that any other suitable arrangement and/or configuration could alternately be used. For example, retainment ridge segments 766 and channels 774 are respectively shown as being substantially identical from occurrence to occurrence. In an alternate arrangement, however, retainment ridge segments 766 and/or channels 774 could differ, such as in size and/or shape, for example, from occurrence to occurrence along or around the piston body.

Piston bodies 640 and 740 can be formed from any suitable material or combination of materials for providing the desired strength and retention properties of piston 606 and 706, respectively. Examples of materials that may be suitable for use in forming the piston body can include fiber-reinforced thermoplastics, such as glass (or other) fiber-reinforced polypropylene and glass (or other) fiber-reinforced polyamide, for example, and high-strength (unfilled) thermoplastics, such as polyester, polyethylene and other polyether-based materials or any combination thereof, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. For example, retainment element 474 of FIGS. 17-20 could take the form of a plurality of retainment elements that are separate from one another and partially embedded within flexible wall 454, such as has been described above in connection with retainment elements 374' of flexible sleeve 312' in FIG. 15. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A gas spring assembly comprising:
a first end member;
a second end member disposed in longitudinally-spaced relation to said first end member such that a longitudinal axis is formed therebetween, said second end member including an end wall, a side wall projecting longitudinally from said end wall in a direction toward said first end member, and a retainment ridge projecting radially outward from said side wall, said retainment ridge including a shoulder surface disposed in facing relation to said end wall and an outer edge having an outer cross-sectional dimension;
a flexible sleeve operatively connected between said first and second end members and at least partially defining a spring chamber therebetween, said flexible sleeve including a flexible wall and an annular reinforcement member, said flexible sleeve extending circumferentially about said longitudinal axis and axially between opposing first and second ends, said annular reinforcement member being substantially-fully embedded within said flexible wall adjacent said second end and including an inner cross-sectional dimension, said flexible wall including an inside surface portion at least partially defining said spring chamber, an outside surface portion facing opposite said inside surface portion and an end surface portion disposed between said inside and outside surface portions adjacent said second end, said first end secured to said first end member such that a substantially fluid-tight seal is formed therebetween, said second end received along said side wall of said second end member such that said inside surface portion of said flexible wall is disposed toward said shoulder surface of said retainment ridge, said outside surface portion of said flexible wall is disposed in abutting engagement with said end wall and said end surface portion forms a substantially fluid-tight seal with said side wall of said second end member; and, at least one retainment element separate from said second end member and said flexible sleeve, said at least one retainment element disposed between said shoulder surface of said retainment ridge and said inside surface portion of said flexible wall, said at least one retainment element including an inner cross-sectional dimension and an outer cross-sectional dimension, said inner cross-sectional dimension of said at least one retainment element being less than said outer cross-sectional dimension of said retainment ridge, and said outer cross-sectional dimension of said at least one retainment element being greater than said inner cross-sectional dimension of said annular reinforcement member.

2. A gas spring assembly according to claim 1, wherein said retainment ridge includes an outer edge having a cross-sectional dimension, and said at least one retainment element includes an inner cross-sectional dimension and an outer cross-sectional dimension, said inner cross-sectional dimension being less than said cross-sectional dimension of said outer edge of said retainment ridge and said outer cross-sectional dimension being greater than said cross-sectional dimension of said outer edge of said retainment ridge.

3. A gas spring assembly according to claim 1, wherein said annular reinforcement member includes a circumferential axis extending about said longitudinal axis, and said at least one retainment element can function to provide resistance to shear forces acting through said flexible wall in a longitudinal direction and provide resistance to rotation of said flexible wall about said circumferential axis of said annular reinforcement member.

4. A gas spring assembly according to claim 1, wherein said at least one retainment element is an endless annular ring.

5. A gas spring assembly according to claim 1, wherein said at least one retainment element is a split ring having an approximately annular shape with first and second end surfaces disposed in facing relation to one another.

6. A gas spring assembly according to claim 1, wherein said at least one retainment element has a cross-sectional shape that is one of approximately rectangular, approximately circular, approximately oval, approximately square, approximately trapezoidal and approximately parallelogram.

7. A gas spring assembly according to claim 6, wherein said at least one retainment element includes an inner edge surface at least partially defining a passage through said at least one retainment element, and an outer edge surface at least partially defining an outer periphery of said at least one retainment element.

8. A gas spring assembly according to claim 6, wherein said at least one retainment element includes a first element surface disposed in facing relation to said shoulder surface of said retainment ridge of said second end member, a second element surface opposite said first element surface and disposed in facing relation with said inside surface of said flexible wall.

9. A gas spring assembly according to claim 8 further comprising a flowed-material joint extending between and operatively connecting said at least one retainment element with one of said inside surface of said flexible wall and said shoulder surface of said retainment ridge of said second end member.

10. A gas spring assembly dimensioned for securement between associated sprung and unsprung masses, said gas spring assembly comprising:

an flexible sleeve having a longitudinal axis and extending longitudinally between opposing first and second ends to at least partially define a spring chamber, said flexible sleeve including:
  a flexible wall extending circumferentially about said longitudinal axis and including an inside surface portion at least partially defining said spring chamber, an outside surface portion facing opposite said inside surface portion, and an end surface portion operatively connecting said inside and outside surface portions along said second end; and,
  an annular reinforcement member substantially-fully embedded within said flexible wall adjacent said second end, said annular reinforcement member including an inner cross-sectional dimension;

a first end member extending across said first end of said flexible sleeve and secured thereto such that a substantially fluid-tight seal is formed therebetween;

a second end member disposed in longitudinally-spaced relation to said first end member and secured across said second end of said flexible sleeve such that a substantially fluid-tight seal is formed therebetween, said second end member including:
  an end wall oriented transverse to said longitudinal axis;
  an outer side wall extending longitudinally from along said end wall;
  an inner side wall projecting longitudinally from said end wall in a direction opposite said outer side wall; and,
  a retainment ridge projecting radially outward from along said inner side wall, said retainment ridge including a shoulder surface disposed in facing relation to said end wall and an outer edge having an outer cross-sectional dimension; and, a retainment element separate from said second end member and said flexible sleeve, said retainment element disposed between said shoulder surface of said retainment ridge and said inside surface portion of said flexible wall, said retainment element including an inner cross-sectional dimension and an outer cross-sectional dimension with said inner cross-sectional dimension of said retainment element being less than said outer cross-sectional dimension of said retainment ridge, and said outer cross-sectional dimension of said retainment element being greater than said inner cross-sectional dimension of said annular reinforcement member.

11. A gas spring assembly according to claim 10, wherein said retainment element is an endless annular ring.

12. A gas spring assembly according to claim 10, wherein said retainment element is a split ring having an approximately annular shape with first and second end surfaces disposed in facing relation to one another.

13. A gas spring assembly according to claim 10, wherein said retainment element has a cross-sectional shape that is one of approximately rectangular, approximately circular, approximately oval, approximately square, approximately trapezoidal and approximately parallelogram.

14. A gas spring assembly comprising:
a first end member;
a second end member disposed in longitudinally-spaced relation to said first end member such that a longitudinal axis is formed therebetween, said second end member including:
  an end wall oriented transverse to said longitudinal axis;
  an outer side wall extending longitudinally from along said end wall;
  an inner side wall projecting longitudinally from said end wall in a direction opposite said outer side wall; and,
  a retainment ridge projecting radially outward from along said inner side wall, said retainment ridge including a shoulder surface disposed in facing relation to said end wall and an outer edge having an outer cross-sectional dimension;
an flexible sleeve extending longitudinally between a first end secured to said first end member such that a substantially fluid-tight seal is formed therebetween and a second end that is secured to said second end member such that a substantially fluid-tight seal is formed therebetween, said flexible sleeve including:
  a flexible wall extending circumferentially about said longitudinal axis and including an inside surface portion at least partially defining a spring chamber between said first and second end members, an outside surface portion disposed in abutting engagement with said outer side wall of said second end member such that said flexible sleeve forms a rolling lobe displaceable along said outer side wall, and an end surface portion operatively connecting said inside and outside surface portions along said second end, said end surface portion disposed in abutting engagement with said inner side wall to at least partially form said substantially fluid-tight seal with said second end member; and,
  an annular reinforcement member substantially-fully embedded within said flexible wall adjacent said second end and including an inner cross-sectional dimension; and,
a retainment element separate from said second end member and said flexible sleeve, said retainment element extending peripherally about said longitudinal axis and disposed between said shoulder surface of said retainment ridge and said inside surface portion of said flexible wall, said retainment element having a cross-sectional shape that is one of approximately rectangular, approximately circular, approximately oval, approximately square, approximately trapezoidal and approximately parallelogram, and said retainment element including an inner cross-sectional dimension and an outer cross-sectional dimension with said inner cross-sectional dimension of said retainment element being less than said outer cross-sectional dimension of said retainment ridge, and said outer cross-sectional dimension of said retainment element being greater than said inner cross-sectional dimension of said annular reinforcement member.

15. A gas spring assembly according to claim 14, wherein said retainment element is an endless annular ring.

16. A gas spring assembly according to claim 14, wherein said retainment element is a split ring having an approximately annular shape with first and second end surfaces disposed in facing relation to one another.

* * * * *